United States Patent
Thomsen et al.

[15] 3,635,548
[45] Jan. 18, 1972

[54] MOTION PICTURE PROJECTOR

[72] Inventors: Jack W. Thomsen, La Grange Park; Arthur E. Nupnau, Chicago; Raymond W. H. Kim, Morton Grove; Jaroslav Cherniavskyj, Skokie; Kiyoshi Iha, Elk Grove Village, all of Ill.

[73] Assignee: Bell & Howell Company, Chicago, Ill.

[22] Filed: Nov. 19, 1968

[21] Appl. No.: 777,018

[52] U.S. Cl..................................352/79, 352/149, 352/180
[51] Int. Cl................G03b 21/18, G03b 21/48, G03b 41/00
[58] Field of Search..................352/180, 147, 169, 149, 173, 352/194, 196

[56] References Cited

UNITED STATES PATENTS

| | | | |
|---|---|---|---|
| 3,159,841 | 12/1964 | Castedello et al. | 352/147 |
| 3,181,174 | 4/1965 | Griffioen et al. | 352/180 |
| 3,402,007 | 9/1968 | Gerlach | 352/180 |
| 3,471,227 | 10/1969 | McClellan et al. | 352/169 |

*Primary Examiner*—S. Clement Swisher
*Attorney*—William F. Pinsak and John E. Peele, Jr.

[57] ABSTRACT

A motion picture projector having a magazine holding a plurality of reels of film any one of which can be selected for projection. Means are provided for automatically unreeling the film from the selected roll, threading it through the projector mechanism to a takeup reel. Provision is made for rewinding the film upon the selected supply reel which rewinding is initiated either automatically at the end of the film or manually prior to that time. A claw mechanism is provided for advancing the film past the film gate in a stepwise manner for film projection. The claw is actuated in an up-and-down direction by a cam which is continuously rotated whenever the projector drive motor is operating. The claw can be shifted with respect to the up-and-down cam thus changing the extent of up-and-down motion and the transverse location of the claw with respect to the film thus providing for two film formats such as Regular 8 and Super 8 motion picture films. The in-and-out motion of claw is provided by a cam follower selectably shiftable between two cam wheels each of which provides a different frequency of in-and-out claw motion so that two rates of projection are possible without introducing flicker in the projected picture. A third selectable position of the cam follower between the two cam wheels prevents in-and-out motion allowing still projection. Interlocks are provided so that the film format may be changed only when the projector drive motor is off, and speed may be changed only when the motor is on. A heat filter is automatically positioned between the light source and film when the projector is set for still projection.

16 Claims, 30 Drawing Figures

INVENTORS
Kiyoshi Iha
Jack W. Thomsen,
Arthur E. Nupnau,
Raymond W. H. Kim
Jaroslav Cherniavskyj.
By [signature] Atty.

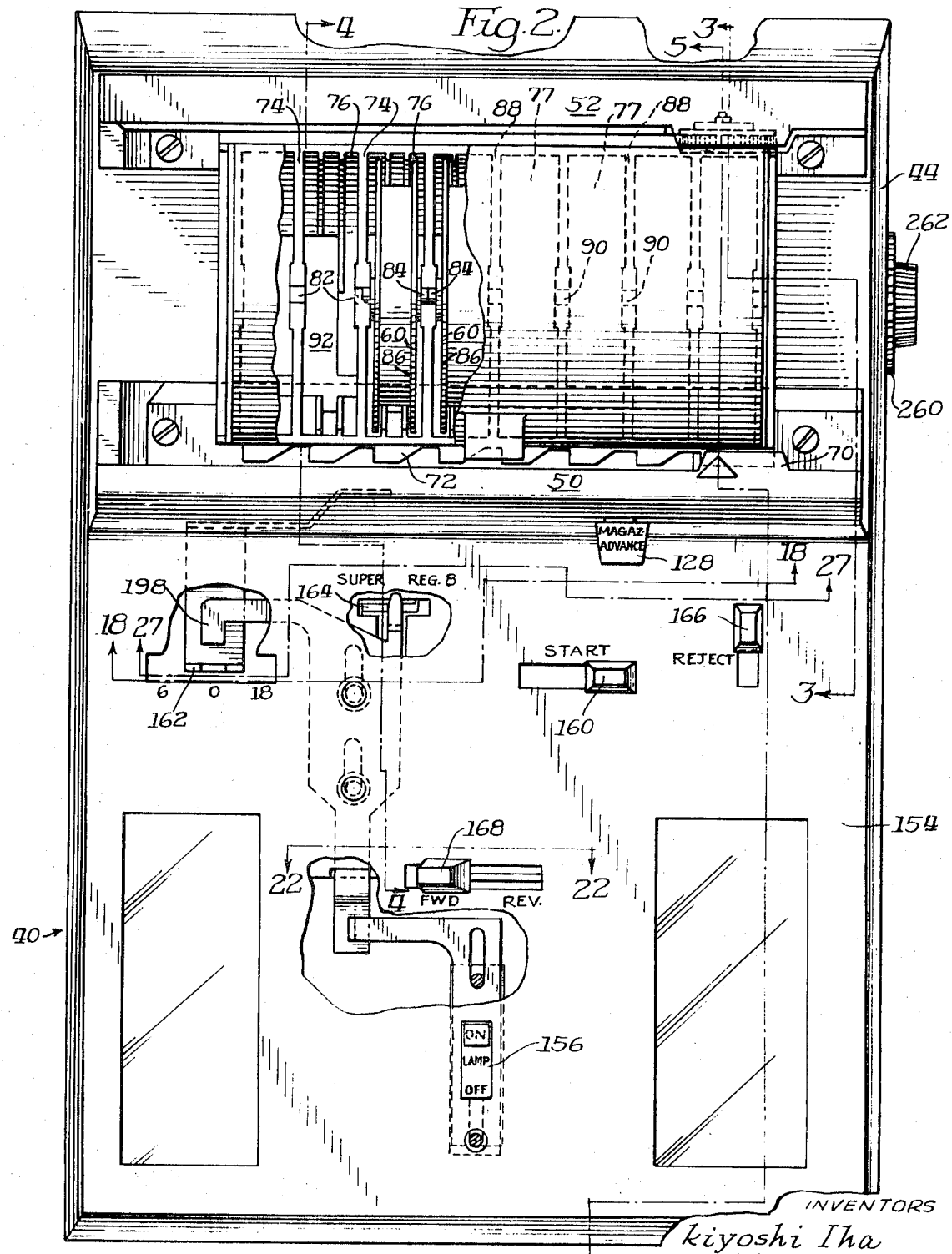

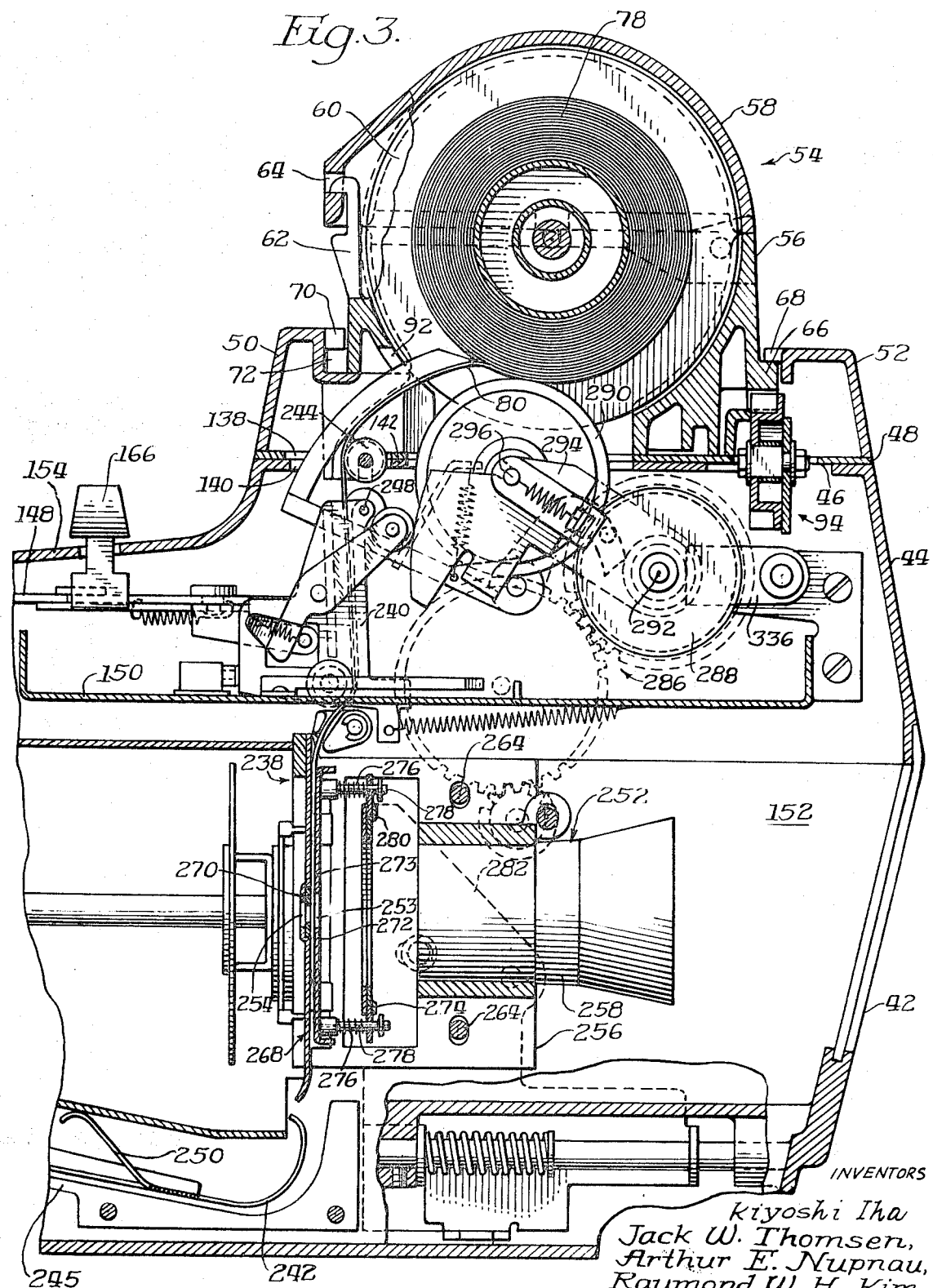

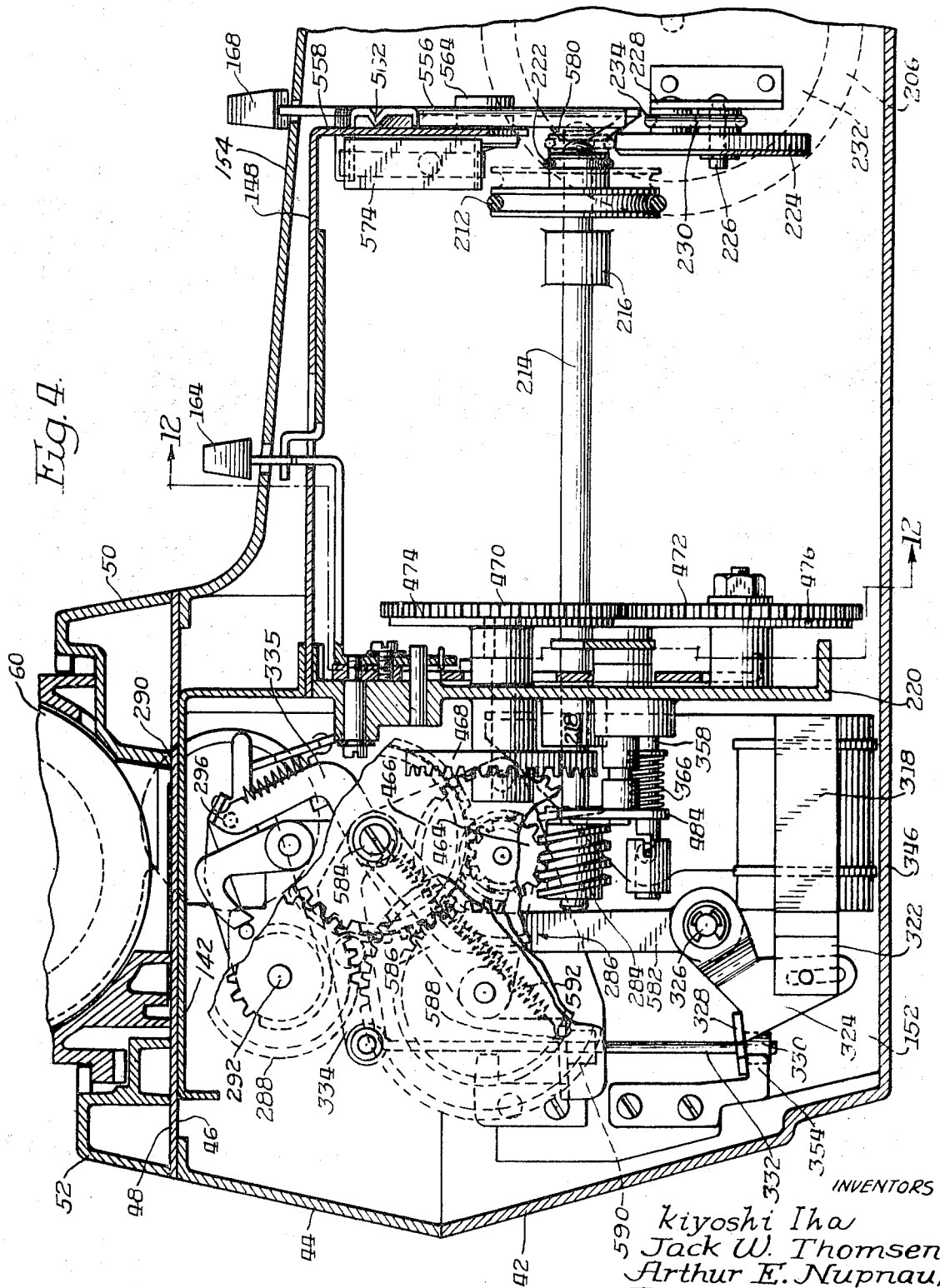

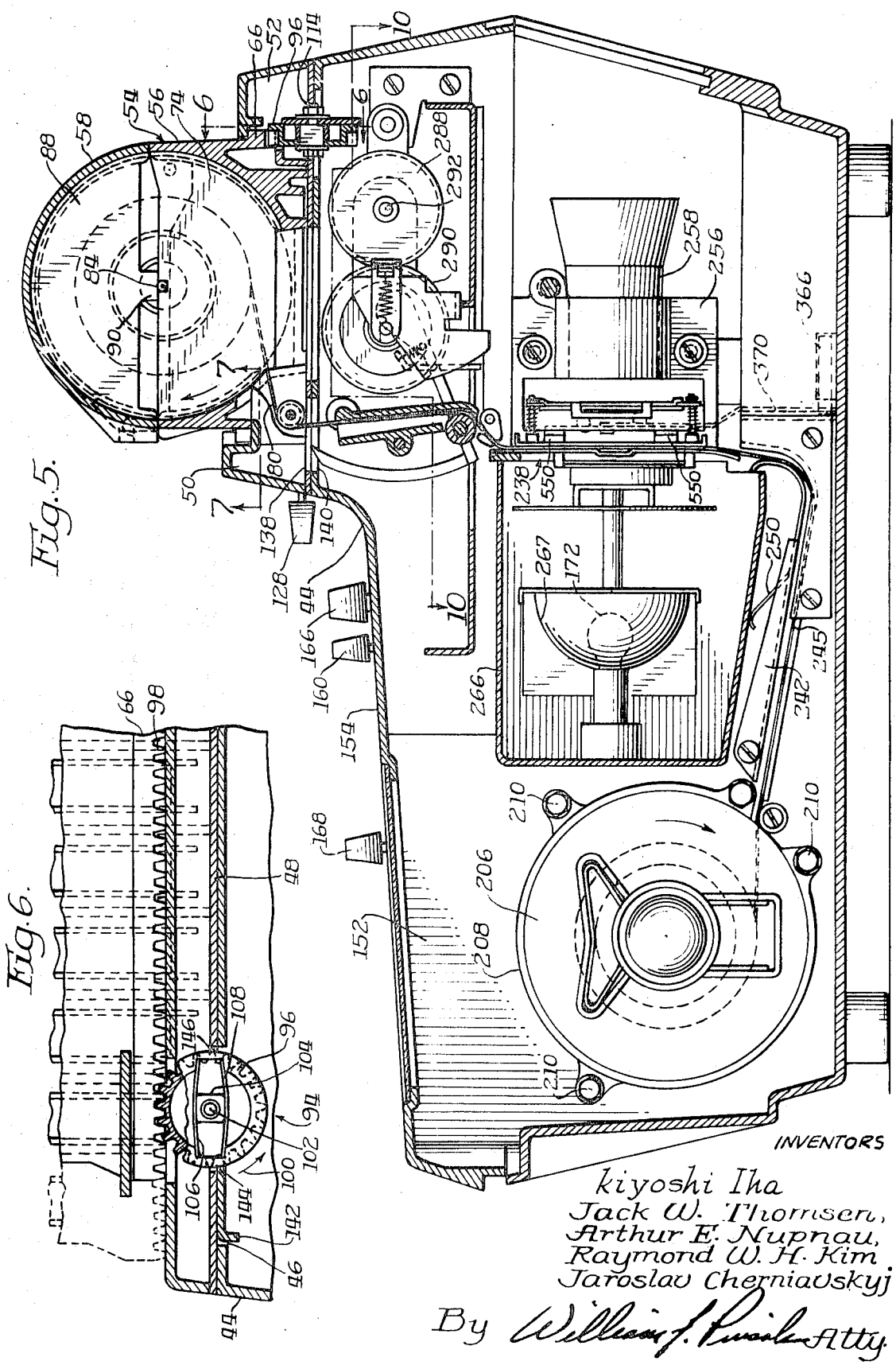

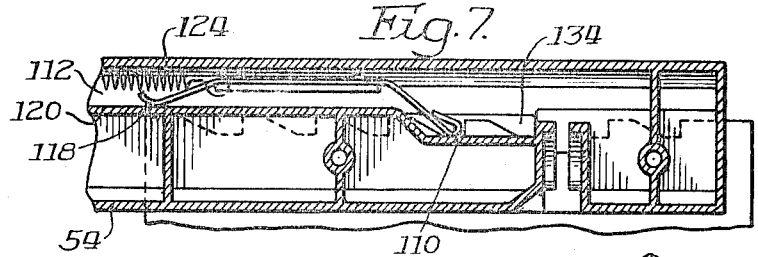
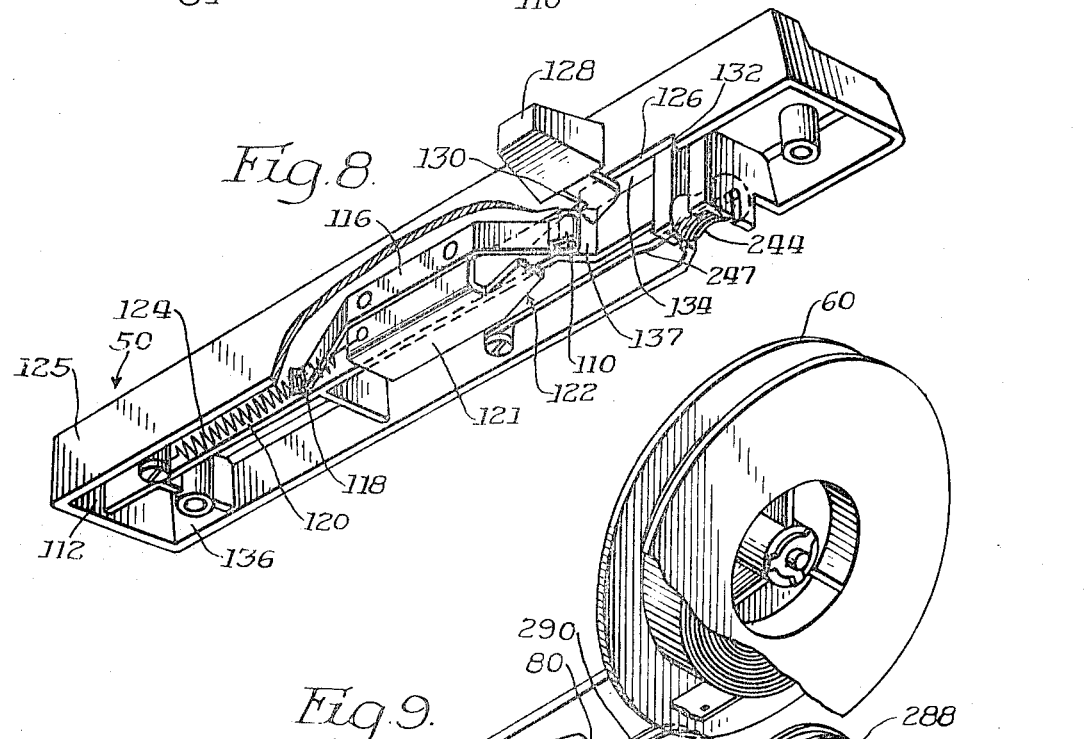
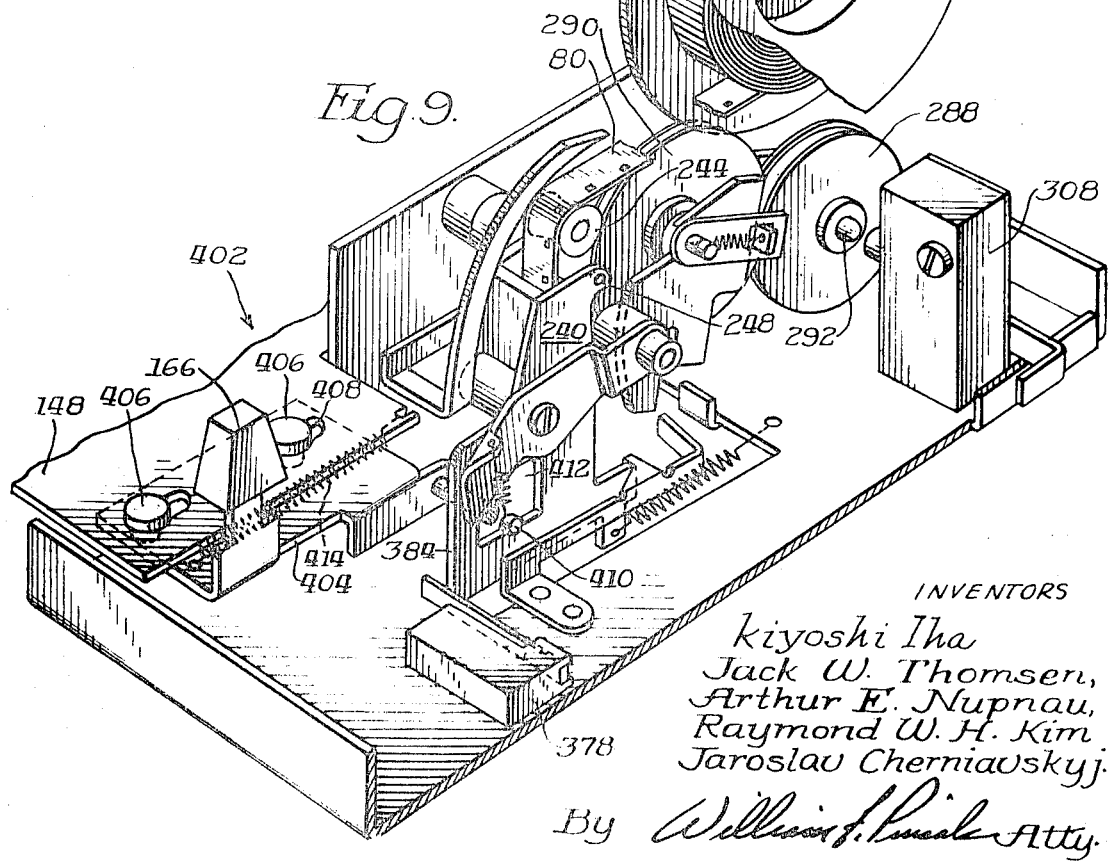

INVENTORS
Kiyoshi Iha
Jack W. Thomsen
Arthur E. Nupnau
Raymond W. H. Kim
Jaroslav Cherniavsky By William F. Pinsak Atty.

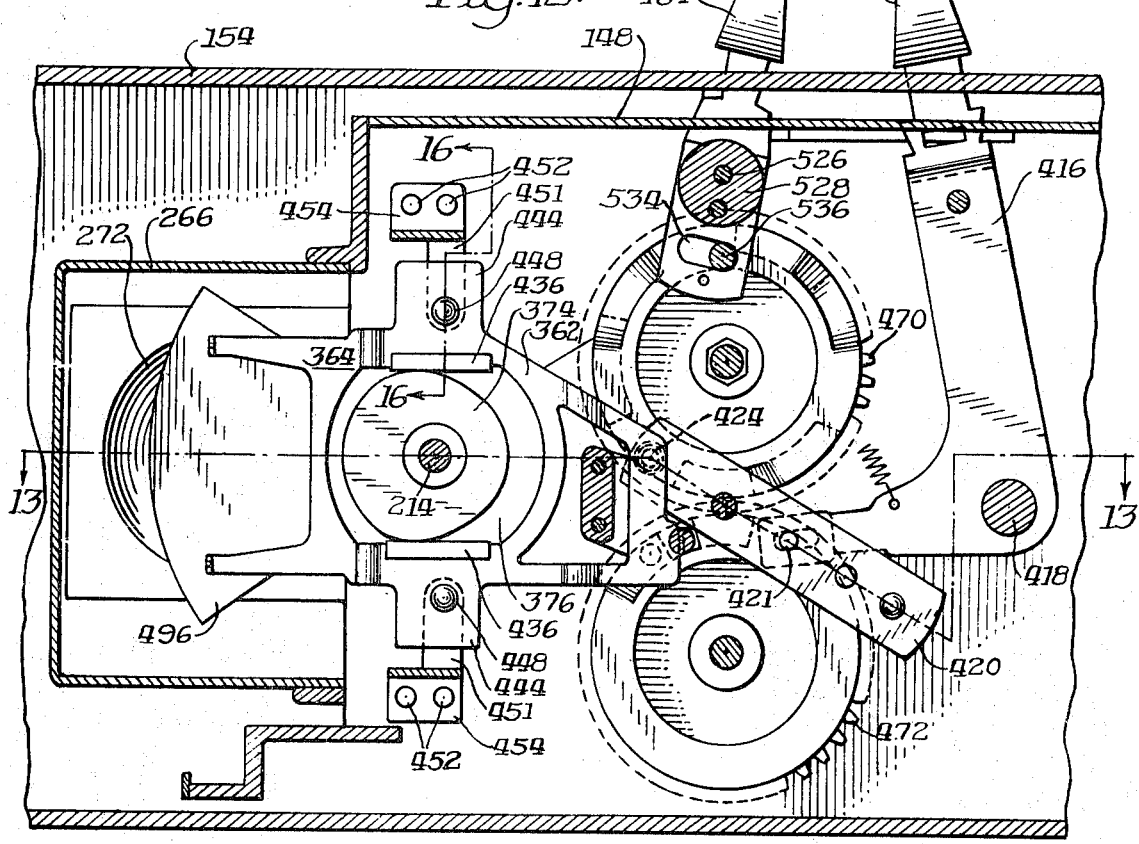
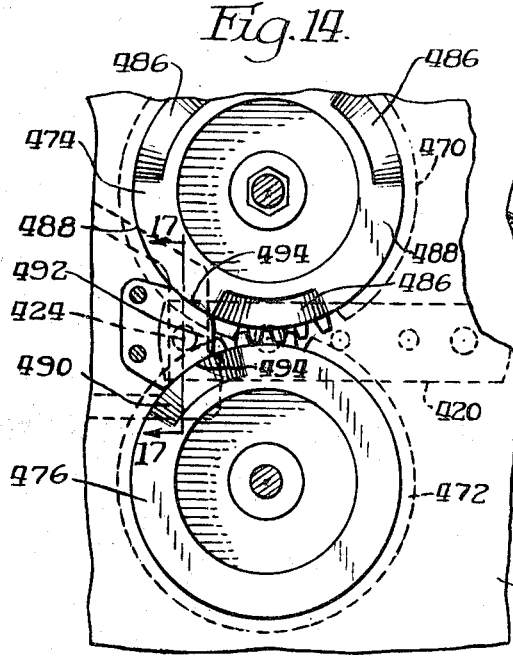
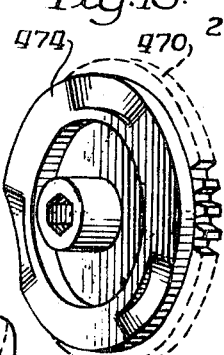
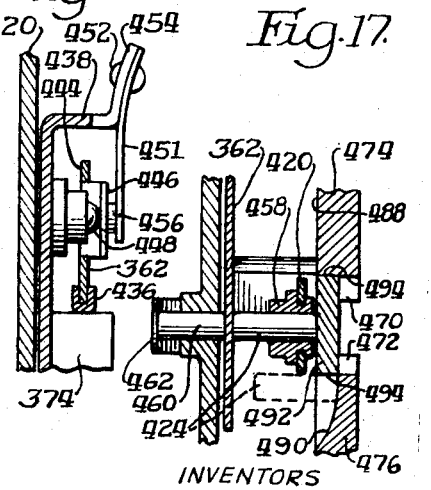
INVENTORS
Kiyoshi Iha
Jack W. Thomsen,
Arthur E. Nupnau,
Raymond W. H. Kim
Jaroslav Cherniavskyj.
By William F. ..... Atty.

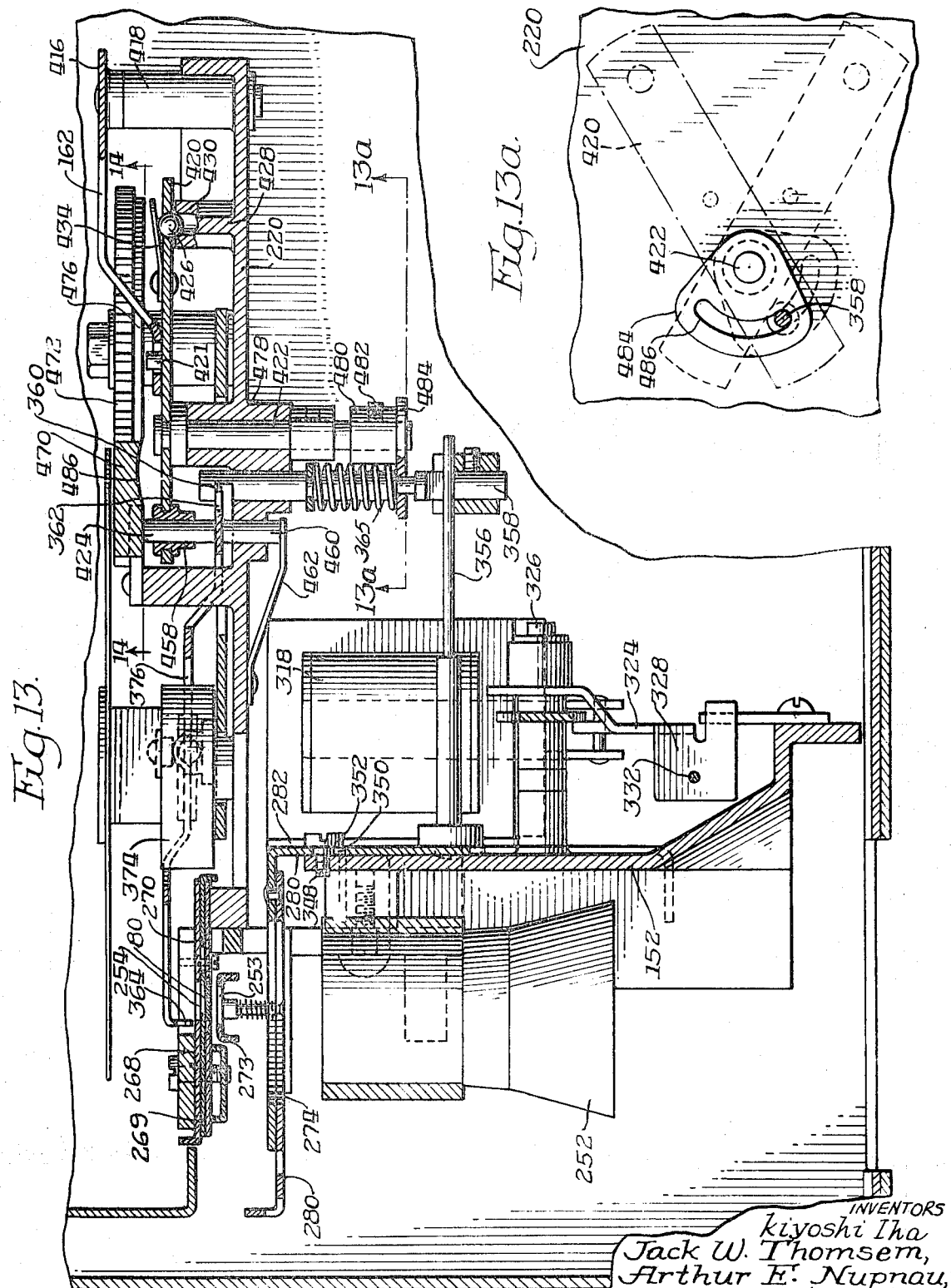

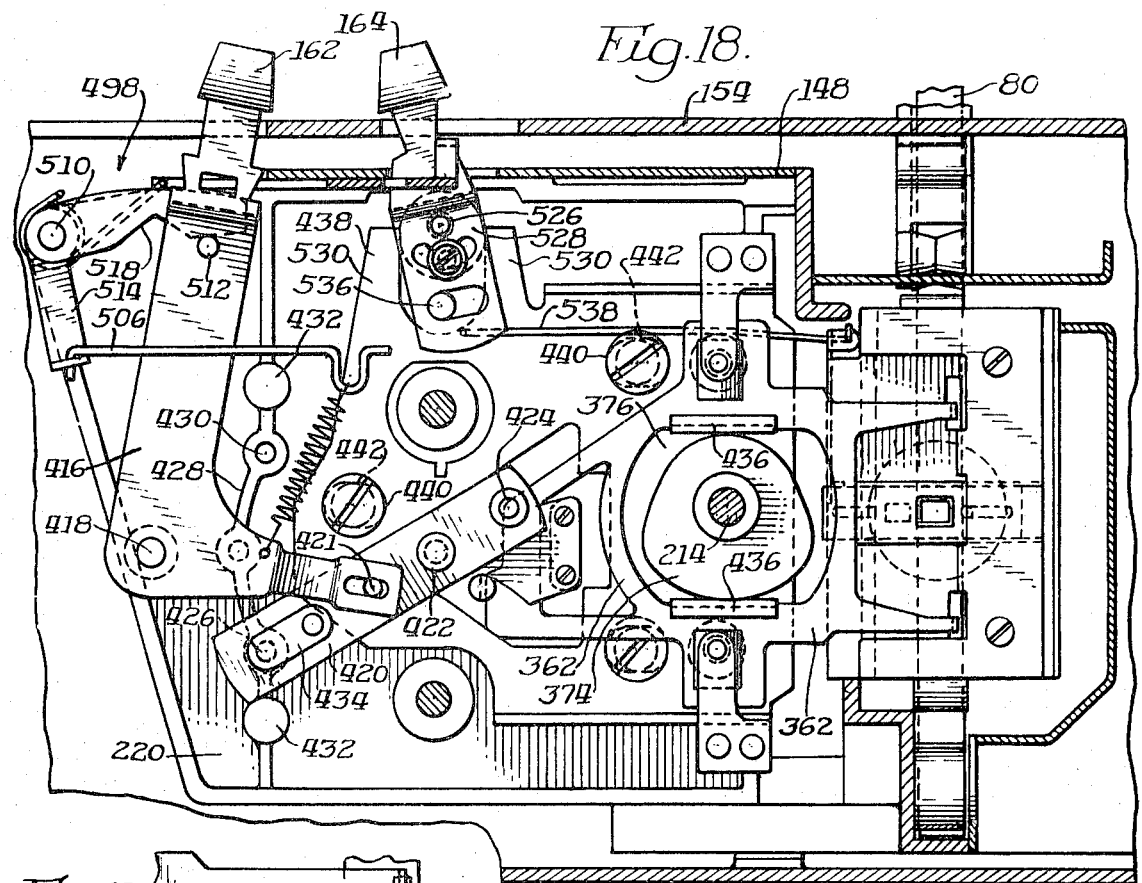
Fig. 18.
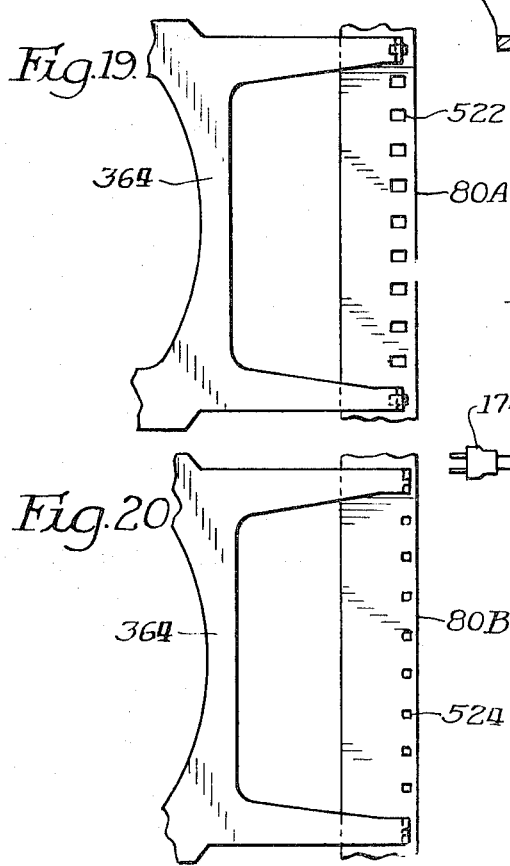
Fig. 19.
Fig. 20.
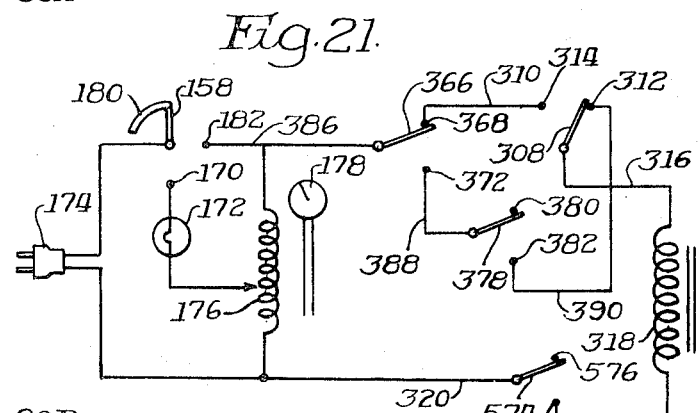
Fig. 21.

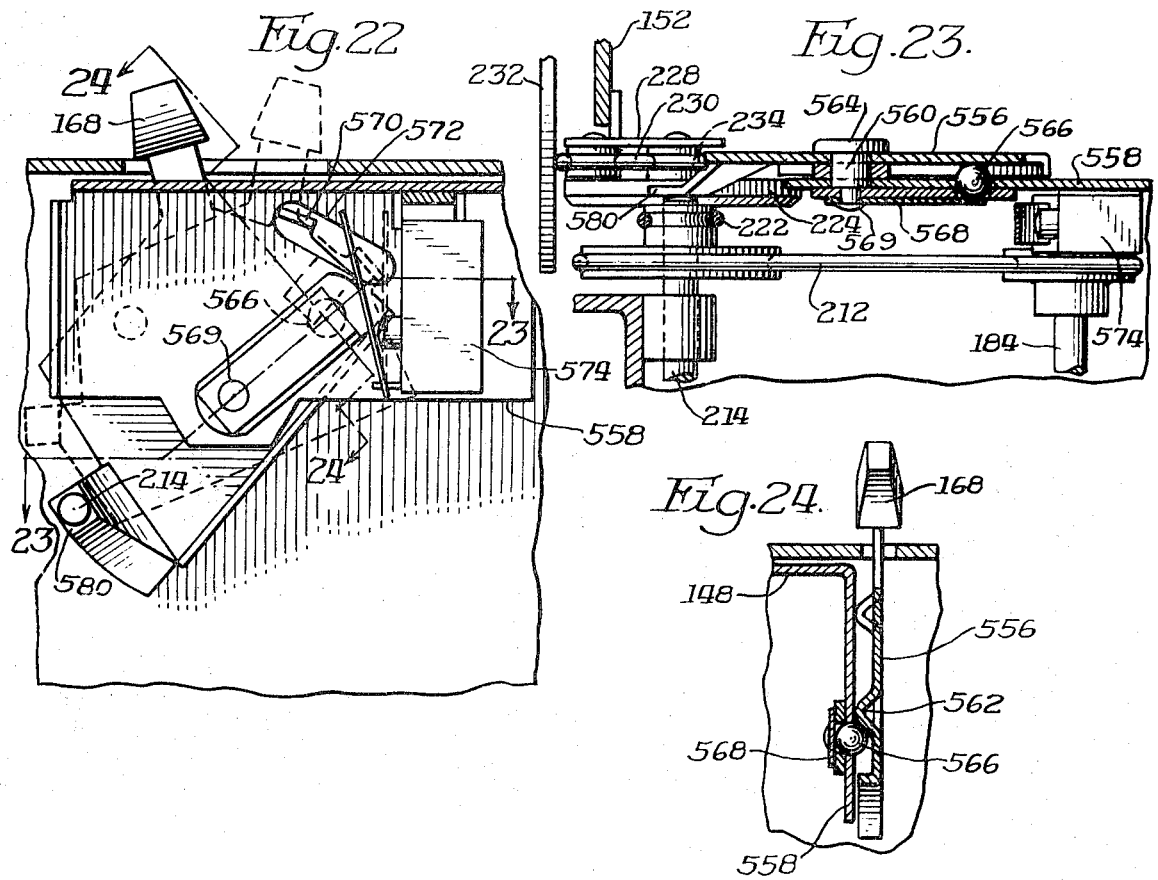

INVENTORS
Kiyoshi Iha
Jack W. Thomsen,
Arthur E. Nupnau,
Raymond W. H. Kim,
Jaroslav Cherniavskyj.
By William F. Pinske Atty.

1

MOTION PICTURE PROJECTOR

The present invention relates to a web-handling device and mechanisms. Particularly, the invention relates to a motion picture projector and mechanisms adapted therefor. While some aspects of the invention are not limited to motion picture projectors as illustrated herein, they have been embodied in such apparatus because of their relevance thereto and because other aspects are thusly limited.

A heretofore known motion picture projector of the class which the present invention is concerned comprises means for automatically threading a filmstrip or web from a supply source into a path in part defined in the body of the projector by a gate. A drivable takeup reel is disposed in receiving association with the supply source and advancing means is adapted intermittently, and preferably reversibly, to drive a filmstrip between the supply source and the takeup means thereby to move successive image frames carried on the filmstrip into a projection position.

Moreover, the projector preferably has a reel magazine to the end that successive filmstrips readily may be projected with a minimum of handling. In such event, indexing means for assuring proper magazine positioning for delivering successive filmstrips into the projector is also associated therewith. A suitable rapid rewind mechanism, operable automatically upon termination of normal projection, also conventional, is provided in the projector.

Furthermore, to attain versatility, the projector is adjustable (1) for projecting filmstrips having frames of different dimensions, for example, standard 8mm. and super 8mm. filmstrips and (2) to vary the speed of film advancement during normal projection to permit viewing of a filmstrip at, for example, 6 frames/second, 18 frames/second or in a still condition. Additionally, the projector has facility for rejecting a filmstrip at any time during projection. The rejecting means may involve at least a part of a mechanism for rewinding a filmstrip following normal or forward projection.

In the projector, a reciprocative claw comprises the agency for advancing a filmstrip in the path therefor. The path is confined at the gate to limit undesirable film movement at the projection station. However, this feature presents a hazard when the filmstrip is moved rapidly such as during rewind or rejection and is unnecessary for control while a filmstrip is initially threaded into the projector. Accordingly, heretofore known projectors have means for withholding the claw from entrance into the film path and for expanding the gate during rapid rewind, reject and threading of a filmstrip.

Heretofore known motion picture projectors of the described class have complicated mechanisms for effecting various projector functions and require the material and labor of assembly which result in relatively high projector costs, when considered in the light of the present invention, an object of which is to provide an improved motion picture projector.

It is an additional object of the invention to provide improved web-handling mechanism.

It is another object of the invention to minimize expense and simplify construction of a motion picture projector of the described class.

It is moreover an object of the invention to facilitate the operation of such motion picture projector.

It is further object of the invention to synchronize various mechanisms in a motion picture projector to preclude jamming which frequently occurs in conventional devices as a result of antagonistic forces arising from attempts to effectively condition various operating mechanisms simultaneously.

Additionally, it is an object of the invention to enable rapid rewind of a film strip from a takeup reel after its trail end has become disconnected from its supply reel and the filmstrip no longer is disposed in a threaded condition within a projector.

Further and other objects will be apparent from the description of the accompanying drawings in which like numerals refer to like parts.

In the drawings:

FIG. 2 is a top plan view of the projector, parts broken away and parts shown in dotted lines for the purpose of illustration.

FIG. 3 is a sectional view taken on line 3—3 of FIG. 2, parts broken away for illustration.

FIG. 4 is a sectional view taken on line 4—4 of FIG. 2.

FIG. 5 is a sectional view taken on broken line 5—5 of FIG. 2.

FIG. 6 is a detailed sectional view taken on line 6—6 of FIG. 5, and illustrating a novel mechanism for indexing a carrier.

FIG. 7 is a detailed view taken on broken section line 7—7 of FIg. 5 and illustrating novel means for advancing said carrier.

FIG. 8 is a perspective view of said carrier advancing means.

FIG. 9 is a perspective view of a reject mechanism comprised in said projector, parts being broken away for illustration.

FIG. 12 is a sectional view taken on broken line 12—12 of FIG. 4 and illustrating a shuttle.

FIG. 13 is a sectional view taken on line 13—13 of FIG. 12.

FIG. 13a is a detailed view taken on line 13a—13a of FIG. 13.

FIG. 14 is a detailed view taken on line 14—14 of FIG. 13 and illustrating cams for controlling an in-and-out movement of said shuttle.

FIG. 15 is a perspective view of one of said cams.

FIG. 16 is a detailed view taken on line 16—16 of FIG. 12 and illustrating the relationship of said shuttle and a mount.

FIG. 17 is a detailed view taken on line 17—17 of FIG. 14.

FIG. 18 is a sectional view taken on line 18—18 of FIG. 2.

FIG. 19 is an elevational view of a claw comprising said shuttle and conditioned for advancing a filmstrip having sprocket perforations of one disposition and dimension.

FIG. 20 is a view similar to FIG. 19, but showing said claw alternately conditioned for advancing a filmstrip having sprocket perforations of another disposition and dimension.

FIG. 21 is an electrical circuit scheme for said projector.

FIG. 22 is a sectional view taken on the line 22—22 of FIG. 2 and showing a forward-reverse handle.

FIG. 23 is a detailed sectional view taken on the broken line 23—23 of FIG. 22.

FIG. 24 is a detailed view taken on the line 24—24 of FIG. 22 and illustrating means for adjustably holding the forward-reverse handle.

FIG. 25 is a detailed view taken on line 25—25 of FIG. 10 and illustrating a manual control mechanism for effecting rapid rewinding of a filmstrip outside the projector onto a supply reel.

FIG. 26 is a detailed view of said control mechanism taken on line 26—26 of FIG. 25.

Figure 1:
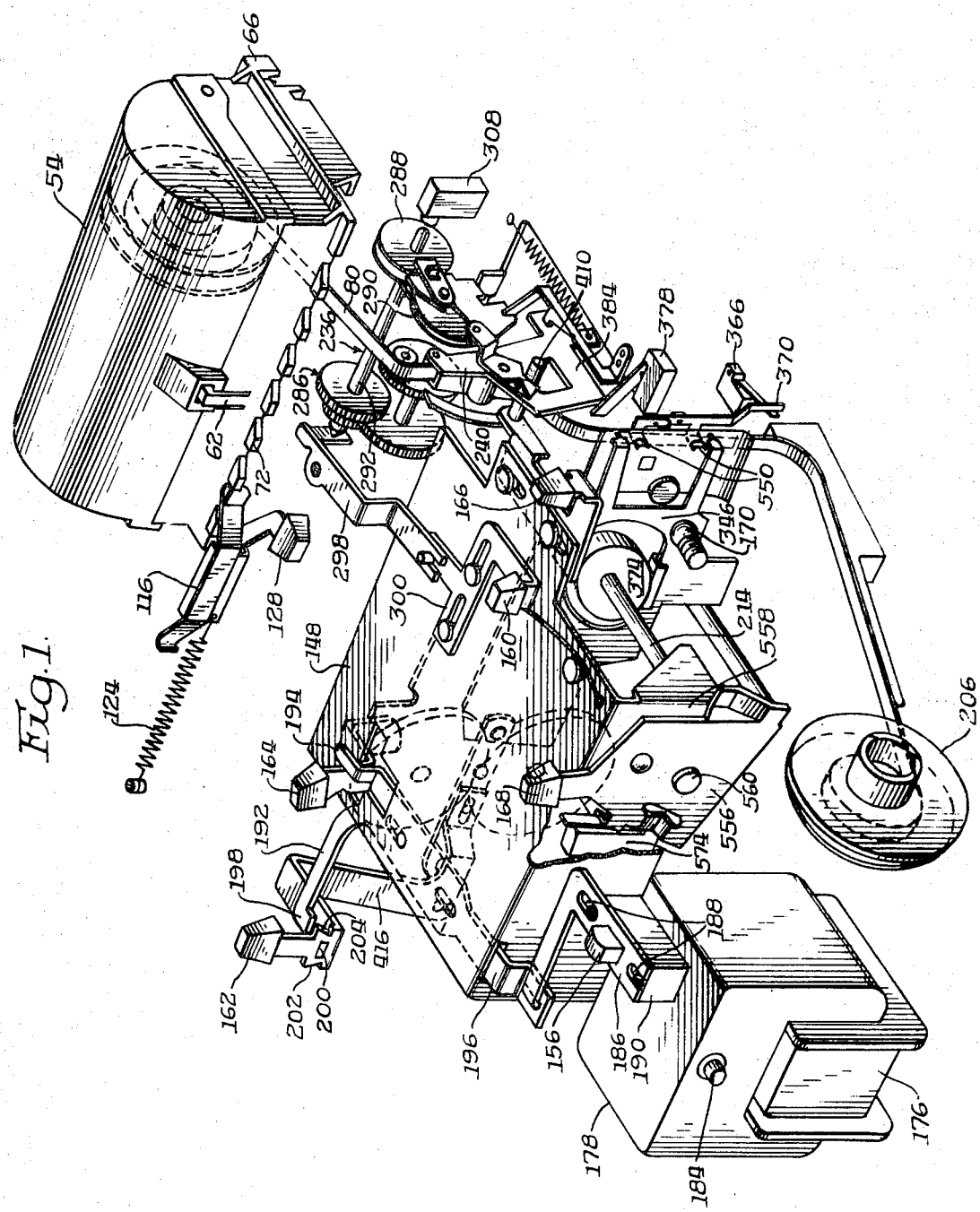
FIG. 1 is a perspective view of a motion picture projector embodying the present invention, parts having been omitted for the purpose of illustration.

Referring now more particularly to the drawings, apparatus for recovering intelligence recorded longitudinally of a web herein is embodied in a projector 40. It has a body defined by a lower housing member 42 (FIG. 3) and an upper housing member 44 with an enlarged opening 46. A cover plate 48 which is secured to housing member 44 is mounted over opening 46. At the forward end of the projector, a pair of thereto transversely extending elongated parallel rear and front guide members 50 and 52 are secured to plate 48 for slidably supporting web or filmstrip supply means, and herein comprising a reel carrier, such as magazine 54, which is arranged for movement longitudinally of a path defined by said guide members.

REEL MAGAZINE

Magazine 54 comprises an elongated case characterized by elongated lower casing member 56, and thereto pivoted dome or cover 58. It is adapted for supporting a plurality of web or filmstrip supply reels 60 in longitudinally adjoining positions. Latch 62, flexibly connected to a medial portion of lower housing member 56, is fashioned and arranged for snap engagement in and disengagement from an aperture 64 in a lip of cover 58. Front rail 66 (FIGS. 3 and 5), which projects from and extends longitudinally of lower casing member 56, slidably engages guide member 52 beneath its holddown extension 68. A like holddown extension 70 of rear guide member 50 is adapted to engage from above rack 72 (FIGS. 2 and 3) comprising a plurality of teeth spaced longitudinally of magazine 54 and carried from its lower casing member 56.

A plurality of lower septa 74, only several of which have been numbered in FIG. 2, and one of which is seen in elevation in FIG. 5, are fashioned integrally with and extend inwardly from said lower casing member 56. The lower septa have top sides disposed in a horizontal plane and define between each adjoining pair thereof a chamber 76 in the lower casing member. As illustrated in FIG. 3, each chamber is adapted to hold therein a rotationally mounted reel 60 for supplying from a thereon supported coil 78 a strip 80 of a film or web. Casing member 56 comprises means defining an elongated slot 92, which in the present embodiment extends longitudinally of the magazine in communication with chambers 76 for passing any of selected filmstrips to and from a corresponding coil 78 about its reel 60.

Each of the septa 74, FIG. 2, has an upwardly opening and medially disposed groove 82. An axle stub 84 projecting outwardly from each reel flange 86 engages in an adjoining groove 82 in a manner such that a pair of axle stubs of flanges of adjoining reels engage in a common groove 82.

A plurality of parallel horizontally spaced inwardly extending upper septa 88 are disposed in substantial vertical alignment with septa 74, respectively. Referring to FIG. 5, they may be fashioned integrally with cover 58 and have lower sides disposed in a horizontal plane and vertically spaced from the top sides of the lower septa. The upper septa define a plurality of upper chamber sections 77 which are upper extensions of chambers 76. Each of upper septa 88 has a depending retainer 90 which is considered carried by the cover in alignment with and for engagement over a corresponding groove 82 for therein holding corresponding axles and preventing upward reel dislocation while cover 58 is closed.

MAGAZINE INDEXING

An indexing mechanism generally designated 94 (FIG. 6) is provided for the carrier comprising magazine 54 to accurately align successive portions such as chambers 76 relative to a station, herein comprising a strip passing opening in the body of the projector. The station is defined by an aperture 138 in cover plate 48 and a therewith registered opening 140 in hanger plate 142, FIG. 5. Thereby, filmstrips 80 may be delivered from selected of successive reels 60 through slot 92 into the projector.

Indexing mechanism 94, referring again to FIG. 6, comprises a member herein shown as a gear 96 which is rotationally supported adjacent the magazine in registered apertures 144 and 146 in plates 142 and 48, respectively, beneath front rail 66. The last rail is fashioned with a depending gear rack 98 which comprises toothed means proportioned and arranged for meshing cooperation with the teeth of gear 96 for advancing said carrier as the gear is rotated.

In the present embodiment, gear 96 is rotatable in a direction of arrow 100 about fixed shaft 102. Detent 104 which is fast on shaft 102, comprises a block with opposed flat faces for releasably holding the magazine. This is done through the medium of spring means comprising a pair of spaced-apart springs 106 and 108 having opposite ends secured to the gear for rotation about detent 104. Said springs are proportioned for simultaneous engagement with opposite flat faces of the detent and for movement over the corners thereof. Moreover, the springs are arranged so that when they are disposed against said flat faces, they will be in a condition of least tension. On the other hand, as gear 96 is rotated to move said springs across the corners of the detent, they will be under high tension. Accordingly, to move the magazine from a position in which the flat detent faces are spring engaged (carrier locked condition) to a succeeding position, sufficient torque is required to overcome the force generated when the springs are under greatest tension from which the gear will snap to a locked position as spring tension is released.

The proportioning of the detent is such that magazine 54 will move spontaneously each time springs 106 and 108 pass over opposed detent corners to align successive to chambers 76 with the station comprised of apertures 138 and 140. Furthermore, the detent faces are arranged for holding or releasably locking the magazine in predetermined and ideal attitude relative to apertures 138 and 140 for transferring or passing a filmstrip therethrough.

In the present embodiment, means for rotating gear 96 and advancing the carrier to successive positions against the holding force of indexing mechanism 94 comprises a ratchet 110 (FIGS. 7 and 8) which is mounted within a chamber 112 defined by a shell comprising guide member 50. Ratchet 110 is secured from one end portion of a bent bandspring 116 whose opposite end portion is bent into a follower 118 in camming association with longitudinal wall 120 formed within chamber 112. A medial portion of spring 116 is suitably anchored in chamber 112 to inner body portion 121 of handle 122 which is arranged for longitudinal movement within said chamber adjacent wall 120. An expansion spring 124 connected to body portion 121 urges the handle as well as thereto connected spring 116 downstream of the normal advancing direction of movement of magazine 54.

Guide member 50 has a rear wall 125 having bottom recess 126 and front wall 136 with a window 134. A manual extension 128 of handle 122 projects outwardly from guide member 50 through recess 126 which is generated between a pair of opposed abutments or shoulders 130 and 132 for limiting forward and backward movement of said handle. Ratchet 110 is arranged and proportioned for normal disposition within chamber 112 against a sloping extension 137 of wall 120 which leads into window 134.

The parts are arranged and fashioned in a manner such that the teeth of successive portions of rack 72 can be seen from the inside of guide member 50 through window 134. Additionally, as handle 122 manually is moved between a first or normal position against wall 130 and the second position against wall 132, ratchet 110 will be carried forwardly and, under normal urging of spring 116, through window 134 into engagement with a flat surface of a tooth disposed adjacent said window. Moreover, for each forward stroke of ratchet 110, magazine 54 will be advanced the width of one of the reel chambers 76. Thereafter, upon release of manual extension 128, ratchet 110 will be carried under urging of spring 124 over the front of the next tooth and into chamber 112, onto the surface of extension 137 into position for a succeeding magazine advancing stroke.

FUNCTION CONTROLS

Hanger plate 142 comprises part of a projector hanger assembly which also includes a right-angular plate 148, a thereto connected mounting plate 150 (FIG. 3), and a projector chassis comprised of a pair of cast vertical walls 152 and 220 (FIG. 4) which are disposed at right angles, one to the other. Plates 142, 148 and 150 are connected together and supported from wall 152. An upper rearward section 154 of housing member 44 is mounted above plate 148 from which a plurality of function control handles (FIGS. 1 and 2) project upwardly through suitable apertures in said section.

Included are an "on-off" handle 156 for operating switch 158 (FIG. 21); a "start" handle 160 for initiating projection in a manner which will hereafter become apparent; a projection speed control handle 162 by which the projector can be conditioned for "still" projection and for projection of frames carried on strip 80 at selected of various speeds, herein being 6 and 18 per second; a format control handle 164 with which the projector can be conditioned for handling conventional standard 8mm. and super 8mm. filmstrips; a "reject" handle 166 with which projection, once begun, can be interrupted and a filmstrip 80 rapidly returned to a web coil 78 on its associated reel 60; and a "forward-reverse" handle 168 for controlling the direction of projection whereby frames on a filmstrip can be advanced intermittently for projection in (1) a normal or forward direction and downstream from a supply reel, and (2) in an upstream or reverse direction. Indicia (FIG. 2) corresponding to the various functions of said handles may be suitably carried adjacent the slots through which said handles project from casing section 154 to the end that various conditions of the projector readily may be effected manually by an operator.

Switch 158 has an "off" position (FIG. 21). It also has a "lamp" position in which switch 158 is closed against a terminal 170 for illuminating lamp 172 through a low voltage tap on coil 176 of motor 178 provided the circuit is connected through plug 174 to a power source (not shown) which may be conventional. Handle 156 has a third or "on" condition (FIG. 2) for operating motor 178 and simultaneously illuminating lamp 172. The "on" position is achieved by moving conductive contact plate 180 into simultaneous engagement with terminal 170 and motor terminal 182 to motivate driving means comprising drive shaft 184 (FIGS. 1 and 23) of said motor.

Handle 156 is arranged for movement along the top of housing 190 of switch 158 within the limits of a pair of spaced-apart slots 188. It is secured to a right-angular switch arm 186 for moving an interlock member 196 to which said switch arm is suitably coupled. The interlock member comprises an elongated body having an extension 192 and a tongue 194, each of which has a position corresponding to each position of the "off-on" handle 156.

Extension 192 carries an interlock lug 198 for removable engagement in an aperture 200 of handle 162. Tongue 194 is adapted for movement between a pair of positions in which said tongue is disposed either in or out of the path of movement of handle 164. The arrangement and proportioning of parts is such that when handle 156 is an "off" condition and handle 162 is conditioned for "still" projection, lug 198 will be engaged in aperture 200 to disable handle 162. When handle 162 is conditioned in either of its speed positions and handle 156 is "off" conditioned, lug 198 will be engaged against corresponding of sides 202 and 204 of said handle for its disablement.

When the interlock member 196 is conditioned for disabling handle 162, tongue 194 will be disengaged from handle 164 enabling its movement and the mechanism controlled thereby. When handle 156 is conditioned "on," lug 198 will be disengaged from handle 162 thereby enabling its shifting to any of its three conditions. Simultaneously, tongue 194 will have moved into the path of handle 164 whereby the same and the mechanism controlled thereby will be disabled. The significance of the foregoing will be apparent from the ensuing description.

A takeup reel 206 (FIG. 5), which may be constructed according to copending application Ser. No. 685,677, now U.S. Pat. No. 3,522,917 assigned to the assignee of the present invention, is rotatably mounted adjacent wall 152 within a ring 208 which is secured from said wall by means of suitable fasteners such as screws 210 or the like. The takeup reel is motivated from drive shaft 184 through the medium of reel drive means including a pulley assembly 212 (FIGS. 4 and 23). The latter couples said drive shaft to a shiftable shaft 214 which is supported for sliding rearwardly and forwardly of the projector body in a pair of spaced-apart bearings 216 and 218 carried respectively from walls 152 and 220. At its rearward end portion, shaft 214 carries a corotational tire 222 for selective driving engagement with a rotatable disc 224. An axis pin 226 for disc 224 is carried from bracket 228 which is suitably secured to wall 52. The drive belt 234 of pulley drive mechanism 230, supported from bracket 228 and entrained for rotation with disc 224, engages bearing plate 232, comprising the inner surface of takeup reel 206. This latter member is disposed in web or filmstrip receiving association with a reel 60 selected as aforesaid.

FILM PATH

A path for a strip of web or film is generally designated 236 (FIG. 1) and defined by a rockable chute 240 (FIGS. 1, 3 and 9), a gate 238, and a rockably mounted spring tensioned plate 242. The chute is disposed in receiving association with the station comprising registered apertures 138 and 140 from which a strip 80 is directed into the upper end opening of said chute by means of a guide roller 244 (FIGS. 3, 8 and 9) mounted in guide member 50. Plate 242 is spaced from a curved direction changing ledge 245 (FIG. 5) projecting from wall 152. Resistance to movement of strip 80 within confined portions of path 236 is minimized by providing a spring mounting 247 for roller 244, a pivotal mounting 248 for chute 240, and by a spring 250 which yieldably tensions plate 242 from ledge 245. However, gate 238 which is disposed medially of chute 240 and plate 242 is constructed for limiting play during projection in a manner to hereinafter become apparent. Accordingly, it is desirable to expand that portion of path 236 defined by said gate whenever rapid movement of the filmstrip is desired, as for example, during initial threading preparatory to forward projection and rapid rewind following forward projection.

A conventional objective 252 (FIG. 3) arranged along path 236 for image projection defines an optical axis which extends through apertures to be hereinafter defined in gate 238. To that end, said gate comprises an aperture plate assembly 268 (FIGS. 3, 13, 28 and 29) and a therefrom spaced pressure pad assembly 274, mounted on opposite sides of path 236. The former, which hereinafter will be described in greater detail, defines aperture 254 disposed about the optical axis. The latter defines an aperture 253 disposed about said optical axis.

The objective includes a bearing mount 256 (FIG. 3) in which lens barrel 258 comprising said objective is slidably adjustable longitudinally of said optical axis. Axial movement of objective 252 may be achieved in a customary manner through the medium of a knurled handle 260 (FIG. 2) carried adjacent the forward end of housing member 44. Framing of objective 252 may be achieved through the medium of a knurled handle 262 which is manually rotatable within the hub of handle 260 for rockably adjusting mount 256, upwardly and downwardly within limits of slots 264.

A lamp housing 266 (FIG. 5) is carried from wall 152 in a manner such that lamp 172 is arranged for reflection of light from reflector 267 through registered apertures 253 and 254 and selected of a pair of apertures 254A and 254B in plate or slide 270 (to be hereinafter further defined).

Aperture plate assembly 268 comprises an aperture plate 269 (FIG. 29) with an offset medial portion or track 271 defining apertures 254. A mask 270 comprises a format adjusting member which is slidably mounted in track 271. Apertures 254A and 254B, defined in said mask, correspond to the various frame sizes for which the projector is adapted.

A pressure pad 273, comprising assembly 274 (FIG. 3), defines aperture 253 and is urged toward aperture plate 269 to prevent wrinkling or play in filmstrip 80 as it passes through gate 238. Urging is by means of a pair of compression springs 276 which are disposed about pins 278 which carry said pressure pad.

Assembly 274 is carried in a mount 280 on one side of wall 152. Said mount extends through said wall to the opposite side where it is rigidly secured to a bracket 282 which is slidably mounted against said opposite side. By reason of the foregoing, bracket 282 is adjustable between a first position in which the assembly 274 is as shown in FIG. 3, and a second position in which said last assembly is moved to the right from the position shown in FIG. 3, thereby to expand path 236. The manner and means by which expansion of the film path is affected will be apparent from ensuing description.

A worm 284 (FIG. 4) is constrained for rotation with shaft 214 to which said worm is secured distal from its connection of shaft 214 to the motor shaft 184. A shiftable gear transmission, generally designated 286, is arranged in driving association with said worm, whereby, while motor 178 is operating, gear transmission 286 will be operatively conditioned. In the present embodiment, details of construction of the gear transmission are according to the teachings of copending application Ser. No. 706,243 now abandoned assigned to the assignee of the present invention. Thereby, the angular direction of rotation of a driven roller 288 (FIGS. 3, 10 and 11) which is corotationally secured to a shaft 292, will be according to the condition of said transmission.

Figure 11:
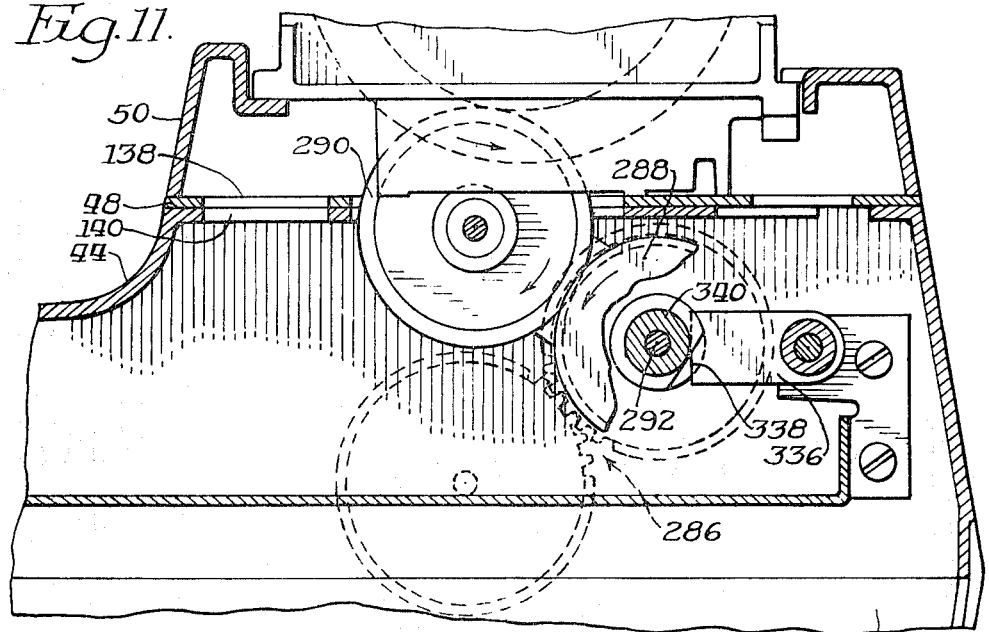
FIG. 11 is a sectional view of said mechanical retaining means taken on line 11—11 of FIG. 10, but illustrating a shiftable shaft in said transmission in an alternate condition.
Figure 10:
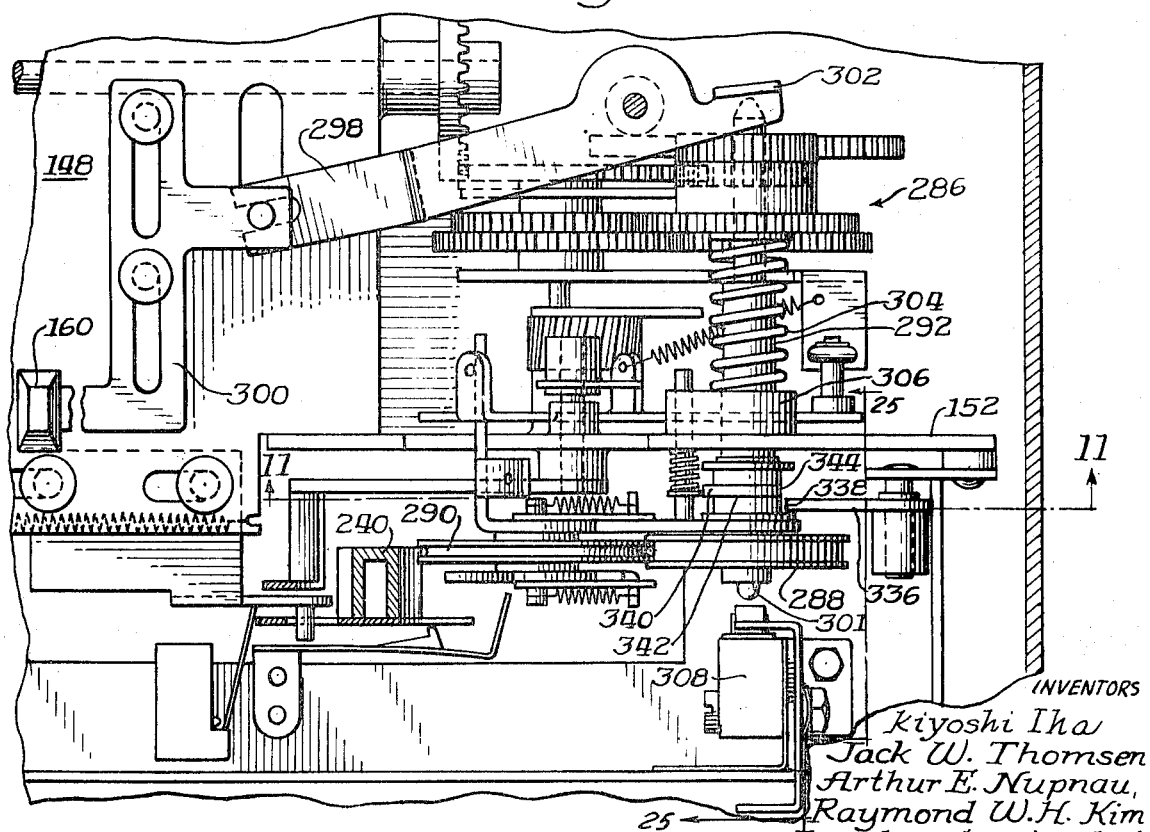
FIG. 10 is a detailed view taken on broken section line 10—10 of FIG. 5 and illustrating mechanical retaining means associated with a shiftable transmission for web threading and rapid rewind.
Figure 27:
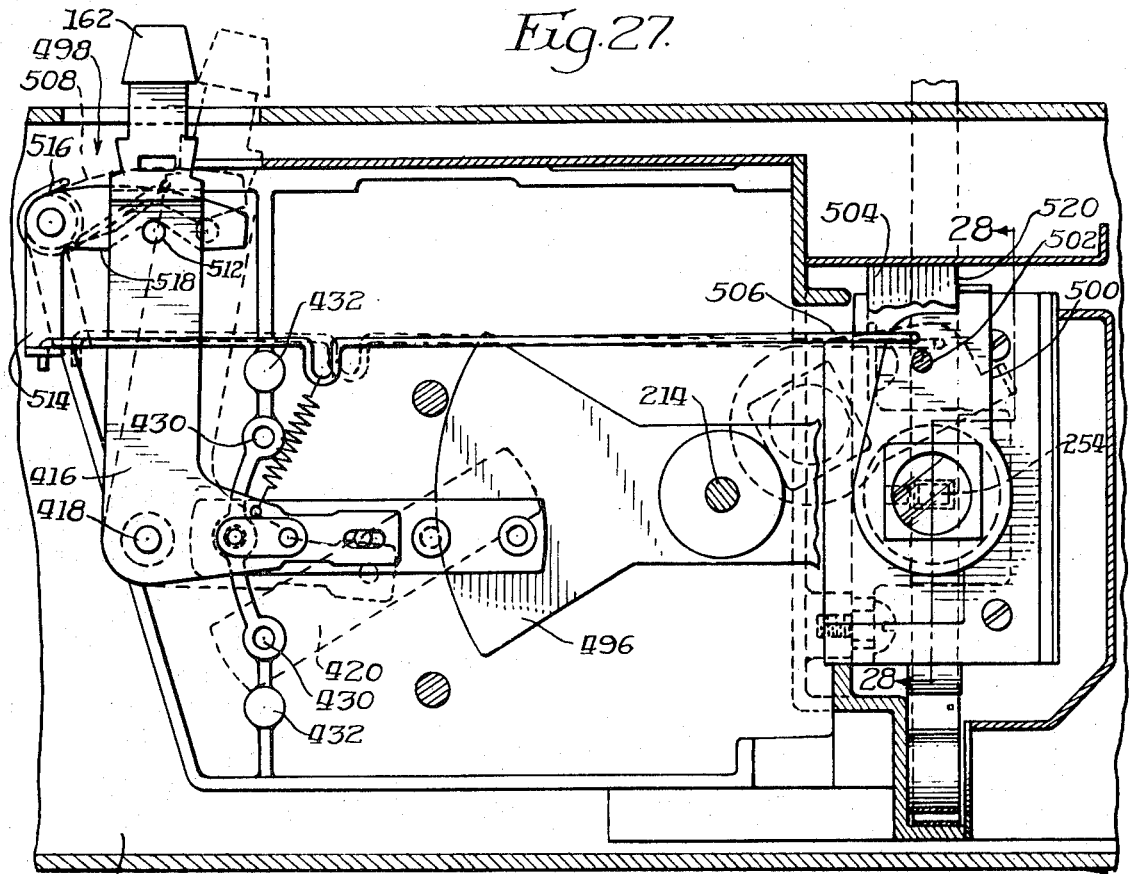
FIG. 27 is a sectional view taken on line 27—27 of FIG. 2 and showing a shutter with parts broken away for the purpose of illustration.

Shaft 292 (FIGS. 1 and 11) is journaled in a bearing assembly 306 (FIG. 10) carried from wall 152 for shifting between a first position, illustrated in FIGS. 1, 5 and 10, and a second position in which said shaft is shifted to the right, from the position shown in FIG. 1 and downwardly from the position shown in FIG. 10 to the position of FIG. 11. The arrangement of said gear transmission is such that while shaft 292 is in its first position, it will rotate counterclockwise with respect to FIG. 1, and when in said second position, it will rotate clockwise.

A driven roller 290 will be rotated clockwise when shaft 292 is in said first position and oppositely when said shaft is in said second position. Moreover, when shaft 292 is in the said first position, driven roller 290 will be aligned with a flange of a selected reel 60 for strip rewind or delivery from said projector onto said reel. On the other hand, when shaft 292 is in said second position, roller 290 will be in vertical alignment with coil 78, between the reel flanges in a manner illustrated in FIGS. 3 and 11 for delivery of strip 80 into path 236. A tie plate 294 which is rockable about shaft 292, though constrained to shift laterally therewith, carries axis pin 296 of driven roller 290 spaced from shaft 292 so that rollers 288 and 290 are maintained in continuous driving association.

Manual means for shifting shaft 292 between its first to its second positions comprises a rockably mounted arm 298 (FIGS. 1 and 10) which is coupled to an extension 300 of handle 160, in a manner such that when the latter member is manually moved to the left with respect to FIG. 1, a working end portion 302 bearing against one end of shaft 292 will force said shaft to the right with respect to FIG. 1 and downwardly with respect to FIG. 10. The manual force required must be sufficient to overcome the tension of a compression spring 304 which is disposed about the shaft 292 for urging an inner end of said shaft toward end portion 302.

A microswitch 308 (FIGS. 1, 10, 21 and 25) having an actuating arm aligned with the opposite end 301 of shaft 292 is responsive to the position of said shaft. Switch 308 is disposed in conductor 310 (FIG. 21). The latter has a portion 386 disposed between terminal 182 and terminal 314 of switch 308 and is adapted to be energized when switch 158 closes against terminal 182. That is to say, when motor 172 is operating, switch 308 has (1) a normal condition against its terminal 312 in which circuit through conductor 310 is interrupted, and (2) an active condition when it is closed against terminal 314 for completing a circuit through conductor 310. Such completion is by means of a circuit wire 316 which connects terminal 314 to one side of solenoid 318 (FIG. 21) whose opposite side is connected through conductor 320 to plug 174. When shaft 292 is in its first position, switch 308 is disposed against terminal 312. However, said shaft is proportioned in a manner such that when it is shifted to its second position, it causes switch 308 to close against terminal 314 for energizing solenoid 318.

A reciprocative arm 322 (FIG. 4) of said solenoid is arranged to be drawn inwardly upon solenoid energization to rock a link 324 about a fixed axis 326. The link has an extension 328 which engages block 330, rigidly secured on the lower end portion of a vertically reciprocative rod 332 for drawing said rod downwardly when arm 322 is drawn inwardly. This action rocks arm 334 which at one end is arranged to rock axle 584. A link 335 is couplingly arranged between axle 584 and axle 296 to rock driven roller 290 between a passive condition in which said roller is disposed in a down position, as illustrated in FIG. 5, and an active condition in which said roller is rocked clockwise about shaft 292 from the position of FIG. 5 for upward movement through slot 92.

Accordingly, when said solenoid is energized, driven roller 290 will be arranged in its active condition effective for causing rotation of an aligned reel 60. When shaft 292 is disposed in its first position, rocking of roller 290 to its active condition will result in application of drive torque to an aligned reel flange for strip rewind. On the other hand, if shaft 292 is in its second position, rocking of roller 290 to its active condition will cause application of torque to reel 60 between the reel flanges and against coil 78 for feeding strip 80 for initially threading said projector.

Solenoid 318 may be energized in a manner other than through operation of switch 308 as will hereinafter be apparent. When the solenoid is deenergized, normal tensions will cause (1) roller 290 to drop to its passive condition (FIG. 5), (2) rod 332 to rise, and (3) link 324 to move clockwise from the position of FIG. 4 as solenoid arm 322 extends to its deenergized condition.

To the end that solenoid 318 is held in an energized state for a period sufficient to deliver a strip 80 of sufficient length during initial threading to enable a shuttle 362 to undertake advancement of the web or film for forward projection, a catch 336 (FIG. 10) is rigidly secured from vertical wall 152 adjacent shaft 292. The catch has a flat inner surface 338 proximate said shaft. A dog 340 which is rigidly secured to the shaft has an arcuate portion 342 concentric with said shaft and a flat surface 344, which connect the ends of the arc defining the arcuate portion. The parts are arranged and proportioned in a manner such that when roller 290 is in its passive condition (FIG. 5), flat surface 344 will be parallel to flat surface 338 to enable clearance of said flat surfaces as shaft 292 is shifted from its first toward its second position. However, upon rotation of said shaft (upon actuation of the solenoid 318 shifting said shaft to said second position), the dog will be partially rotated to bring its arcuate portion 342 into overlapping relationship with catch 336. Return of the shaft 292 to its normal condition will thereby be prevented. This last condition will prevail until a sufficient length of strip 80 has been fed into the projector for deenergizing solenoid 318 in a manner to appear hereinafter, thereby to restore roller 290 to a passive condition, shaft 292 to its first position, and to release switch 308.

Solenoid 318 is rigidly secured by any suitable means to bracket 282 for supporting said solenoid above the housing floor 346 (FIG. 4). Stop means in the form of a screw 348 (FIG. 13) held in wall 152 projects through a pair of registered slots 350 and 352 in mount 280 and bracket 282, respectively. The latter are slidably adjustable within the limits of slot 350 which defines (1) a first position to which pressure pad 273 is normally urged for disposition in projection position close to aperture plate 269, and (2) a second position (FIG. 4) in which pressure pad 273 has been moved away from said aperture plate, thereby to expand path 236.

The last condition is effected by movement of solenoid 318 from its normal position and against its normal urging downwardly to the position illustrated in FIG. 13. Such movement results because the parts are proportioned in a manner such that, when said solenoid is energized, downward movement of rod 332 beyond the position of FIG. 4 is arrested by a boss or stop 354 which is disposed in the path of movement of extension 328. While this arrested movement is sufficient for rocking drive roller 290 to its active condition, it is insufficient to dissipate all of the solenoid energy. In consequence, the solenoid will move from its normal position shown in FIG. 4 to the left thereof, carrying with it slidable bracket 282 and therewith coupled components to assume the condition of FIG. 13.

A control member or arm 356 (FIG. 13), which extends normally away from wall 152 is rigidly secured to bracket 282 and mount 280. Accordingly, when solenoid 318 moves as aforesaid, arm 356 will move correspondingly. The end portion of arm 356 distal from wall 152 extends transversely of a shaft 358 in a slot of which arm 356 securedly engages. A medial portion of shaft 358 is slidably supported in and transversely of vertical wall 220; and an end portion of shaft 358 distal from its engagement with arm 356 and disposed on an opposite side of wall 220 has a slot 360 in which is engaged the lower end portion of shuttle 362.

Shuttle 362 is arranged for up-and-down and in-and-out movement. For up-and-down motivation, the shuttle has an aperture 376 (FIGS. 12, 13 and 18) in which there is disposed an up-and-down cam 374 which may be of conventional profile. The latter is corotational with shaft 214 and comprises means for advancing the web once the same has been threaded through gate 238.

The shuttle carries or has at an outer end portion a claw 364 which is rockably arranged for in-and-out movement through aperture plate 269 into and out of path 236 for engagement in and disengagement from the customary sprocket perforations of filmstrip 80 for intermittent advancement. The parts are arranged in a manner such that when the solenoid moves from the position of FIG. 4 to the position of FIG. 13, shuttle 362 will be rocked and held so that claw 364 is prevented from entering the film path. On release of the solenoid arm 322, shaft 358 will be assisted in movement upwardly with respect to FIG. 13 to its normal position under the urging of a compression spring 365 which is operably disposed about said last shaft.

A microswitch 366 (FIGS. 1 and 21) which is responsive to filmstrip sensor 370, is disposed below gate 238 and in conductor 310. Switch 366 is normally closed against a terminal 368 to maintain a circuit through conductor 310. Sensor 370 has a pair of sensor arms 550 which are vertically spaced from each other for disposition adjacent the film path for successive engagement by filmstrip 80 as it is being initially threaded into the projector. The parts are proportioned in a manner such that when the lowermost of said arms 550 is engaged by the filmstrip, the sensor 370 will be shifted against its normal urging a distance sufficient to hold switch 366 against a terminal 372 in which the circuit through conductor 310 is interrupted. Such interruption will prevent the solenoid from being energized. In consequence thereof, driven roller 290 will be in its passive condition, solenoid 318 and pressure plate 272 in their normal positions, and shuttle 362 will be in a condition for in-and-out movement to effect advance of the filmstrip.

AUTOMATIC REWIND

When coil 78, on a selected reel 60, has become depleted for further forward projection, the forward driving takeup reel 206, which is adapted for automatic conventional connection and release of a filmstrip for takeup and rewind, will tension the filmstrip for activation of rapid rewind means. The latter comprises a microswitch 378 (FIGS. 1, 9 and 21) which has a normal condition closed against terminal 380, and a rewind condition, closed against terminal 382. The last switch is arranged for movement from its normal condition to its rewind condition in response to the tensioning of filmstrip 80. In consequence thereof, chute 240 will be rocked about pivot 248 in a manner such that switch 378 is urged to its rewind condition by an abutment bracket 384 which is constrained from movement with said chute.

When switch 378 is "rewind" conditioned, a circuit is completed from one side of the source through section 386 of conductor 310, thence through switch 366, which is then closed against terminal 372, thereafter through a circuit wire 388 which couples terminal 372 to terminal 382 through the switch 378, through a conductor 390, which connects terminal 382 to terminal 312, through switch 308, circuit wire 316 and solenoid 318 to the other side of the source through conductor 320. As the solenoid is thusly energized, shaft 292 will be caused to rock to elevate driven roller 390 from its passive to its active condition. At this time, driven roller 290 is rotational through transmission 286 in a rewind direction because shaft 292 is in its normal or first position. Accordingly, said driven roller then will be in vertical alignment and engaged with a flange of supply reel 60 through which rewind torque for returning filmstrip 80 from the takeup reel to the supply reel will be applied until the tension on the web is released in consequence of liberation of the lead end of filmstrip 80 from the takeup reel. Thereupon, switch 378 will be restored to its normal condition and the solenoid deenergized.

Ordinarily, the trail end of the filmstrip 80 is anchored on the supply reel by reason of which tension will generate for actuating switch 378 once the supply of coil 78 is exhausted. However, occasionally through inadvertence, the trail end of the coil may not have been suitably anchored on its supply reel. In consequence thereof, the trail end will become separated from the supply reel under continuing forward drive because the rapid rewind means cannot be automatically actuated. To the end that a filmstrip which is entirely transferred to the takeup reel may be rewound, the takeup reel is first manually removed from the projector, the trail end of the filmstrip is the connected to the supply reel and an auxiliary rewind means is actuated.

Such last means includes handle 392 (FIGS. 25 and 26) which is manually accessible through opening 394 in member 44. Said handle is rockable adjacent the casing microswitch 308 about pivot 396 for moving shoe 398 between a passive condition (solid line of FIG. 25) and an active condition (dotted line of FIG. 25). In the latter condition, said shoe engages and holds microswitch 308 against terminal 314 while in the former condition, microswitch 308 is in its normal condition. With the shoe in its active condition, a circuit is completed from one side of a power source through conductor 310, microswitch 308, solenoid 318, and back through the other side of the source via conductor 320.

In consequence of such actuation of the solenoid, the gate will expand and the shuttle will be disabled, as aforesaid, and shaft 292, which is then in its normal position, will be rocked to correspondingly rock the driven roller 290 to its active condition and into engagement with the aligned flange of reel 60. With shaft 292 in such condition, of course, the gear transmission is in a rewind condition and accordingly the reel will be rotated in a counterclockwise direction with respect to FIGS. 3 and 5 to rewind the filmstrip onto the supply reel. Rewinding through actuation of solenoid 318 will continue so long as the shoe 398 maintains its active condition. To accomplish the foregoing, it is not necessary to manually hold in handle 392, as it is frictionally retained in any position of adjustment by a bowed spring 400, which is mounted about pivot 396 and frictionally bears against retaining nut 402 and the housing of microswitch 308.

Solenoid 318 can be also manually energized through the medium of handle 166 which controls a reject mechanism, generally designated 402 (FIG. 9). Handle 166 is an assembly including an integral flat boss 404 which is slidably disposed beneath hanger plate 148 and has a pair of upwardly extending lugs 406 which engage in slots 408 in said last hanger plate for limiting movement of handle 166. An end portion of pin 410, which is rigidly secured to boss 404, has an opposite end portion which is disposed in a window 412 of bracket 384. Handle 166 is arranged for movement between a first position in which pin 410 is free from the sides defining window 412, and a second condition in which the pin engages one of the sides of window 412 for holding bracket 384 in engagement with microswitch 378, which is in turn held out of its normal position and in contact with terminal 382.

When handle 166 is in its second condition, solenoid 318 is adapted to be energized (in the manner described for energizing said solenoid in connection with fast rewind) for expanding gate 238 and disabling shuttle 362. In consequence of the foregoing, projection can be interrupted at any time to cause filmstrip return to the supply reel. This feature is especially helpful because an operator will not have to wait until forward projection has been completed if for any reason it is desired to reject a filmstrip which is in projection condition. Handle 166 is urged to its passive condition by an expansion spring 414, one end of which is anchored on hanger plate 148 and the opposite end of which is secured to an appropriate part of boss 404.

SHUTTLE AND CLAW OPERATION

Up-and-down movement is imparted to shuttle 362 through a pair of opposed follower shoes 436 which line aperture 376 and are disposed in operative engagement with cam 374. The shuttle is associatedly held from a shuttle mount 438 (FIGS. 16 and 18) for up-and-down reciprocation relative thereto. The mount is connected to wall 220 by means of a plurality of mounting screws 440 and adjustable horizontally within the limits of a plurality of slots 442 in said mount through which said screws project. Shuttle 362 has a pair of vertically spaced-apart mounting projections 44 (FIG. 12) having vertically aligned outwardly offset pockets 446 (only one of which is clearly evident in FIG. 16). In each pocket, a ball bearing 448, which is seated in a socket 450 secured from mount 438, is rotatably engaged. Shuttle 362 maintains intimate, sliding and rocking engagement with each of ball bearings 448 by reason of one of a series of bandsprings 451, shown fastened by a rivet 452 to a marginal portion 454 of shuttle mount 438. A bearing member 456 carried from one end of each spring 451 engages the outer surface of offset portion 446 for urging said shuttle mountward whereby up-and-down and in-and-out shuttle reciprocation is enabled relative to said mount.

SPEED CHANGE CONTROL LINKAGE

In the present embodiment, the rate of up-and-down shuttle reciprocation is governed by speed control handle 162 which is adapted to be rocked for selection of either of two projection speeds or still projection. To that end, an inwardly extending shank 416 (FIGS. 1, 12, 13, 18 and 27) of said handle is rockable about a pivot 418 which is supported from wall 220. Handle 162 is connected through coupling pin 421 to a follower control member 420 for moving an in-and-out cam follower 424 (FIG. 13) to any of three selected corresponding positions. The follower control member is rockable about an axis provided by shaft 422, which is journaled in an elongated bearing 478 (FIG. 13) fashioned integrally with wall 220 and to which said control member 420 is rigidly secured.

A collar 480, which is corotational with shaft 422 by reason of setscrew 482, is fast to an abutment plate 484 against which one end of biasing spring 365, heretofore described, bears. Said abutment plate is formed with an arcuate slot 486 (FIG. 17) through which a medial portion of arm 358 slidably extends. Thereby, shaft 422 and therewith corotational abutment plate 484 may rock from side to side upon operation of handle 162 without affecting the slidable operation of arm 358.

To releasably retain the follower in each selected position, a ball detent 426 is carried in control member 420 and is urged toward a detent track 428 which is fashioned integrally with and projects outwardly from wall 220. The detent track has a plurality of ball sockets 430 and a pair of opposed stops 432 at opposite ends of said track. Ball sockets 430 are spaced apart from each other for receiving detent 426 at positions of follower control member 420 corresponding to the two-speed and still projection positions of follower 424. A leaf spring 434 has one end portion anchored on the cam control member and its opposite end portion in bearing association with detent 426 for urging the same toward wall 220. Stops 432 are effective for limiting rocking of control member 420 beyond the limit of detent track 428.

In-and-out follower 424 is slidably mounted in a bearing 458 (FIG. 13) carried in the end portion of control member 420 for engagement of its inner end portion with a claw distal portion of shuttle 362. The shuttle is urged into engagement with follower 424 by means of pin 460 which is slidably mounted in wall 220 and exerts a force on a face of shuttle 362 opposite the face thereof engaged by follower 424. Desired tension is maintained on said shuttle by a leaf spring 462 which at one end is secured to wall 220 and at its other end urges pin 460 into shuttle engagement.

Selected in-and-out motion of the shuttle for rocking the claw 364 in and out of the gate for advancing filmstrip 80 results from torque transmitted from worm 284 through a gear 464 (FIG. 4) of transmission 286. Gear 466, which is corotationally mounted with gear 464, drives a face gear 468 which is disposed adjacent the forward side of the wall 220. The shaft of the face gear is journaled in said last wall and has secured thereto adjacent the rearward side of wall 220, a cam gear 470 (FIGS. 4, 12, 13 and 14). The latter is operably enmeshed with a second cam gear 472. A face cam 474 and a thereto coplanar face cam 476 carried from gears 470 and 472, respectively, and having independent and parallel axes of rotation, are directed toward wall 220 for engaging association with follower 424.

Gears 470 and 472 in the present embodiment are of equal radii for rotation at equal rates. The cam 474, however, is fashioned with three equally spaced dwells 486 between which there are disposed a like number of throw surfaces 488. On the other hand, cam 476 has only one dwell 490 which is fashioned and proportioned like any of the other dwells. A stationary "still" cam or bridge 492 is mounted in a clevis between gears 470 and 472 and has a throw surface which is disposed in the plane of the throw surfaces of cams 474 and 476. Follower 424 may be engaged with cam 474, cam 476 or cam 492 upon selective shifting of handle 162.

The parts are arranged so that when follower 424 is engaged with a throw surface, claw 364 will be restrained from entering the gate and a full film frame will be registered with aperture 254 for projection. On the other hand, when follower 424 is disposed in a dwell, claw 364 will be disposed in the gate under the urging of spring 462 for transporting film and in a manner as understood by reference to FIG. 13.

In this embodiment, the parts are proportioned so that, when follower 424 is conditioned for operative association with cam 476, claw 364 can enter the gate 6 times per second for advancing a filmstrip. Also, when follower 424 is conditioned for operative association with cam 474, claw 364 can enter the gate three times more frequently, thus advancing a filmstrip at the rate of 18 frames per second. However, when follower 424 is operatively associated with cam 492, claw 364 will be prevented from entering the gate, thus conditioning the projector for "still" projection.

To prevent "still" projection while film is in a transport condition, bridge 492 is provided with a pair of opposed vertical walls 494 (FIG. 17) which define a pair of abutments for preventing shifting of follower 424 from a position within a cam dwell (dotted line of FIG. 17). Accordingly, the follower only can be shifted onto the bridge (solid line of FIG. 17) from a position in which it is in engagement with a throw surface of cams 474 and 476. This arrangement ensures that a full film frame will be in aperture 254 during "still" projection.

The rapidity of cam rotation prevents damage to the follower and connected parts when shifting is attempted while the follower is in a dwell and cams 474 and 476 are being driven, because an abutting wall 494 then quickly falls away from the shifting path. But this phenomenon does not prevail when the cams are not moving. Potential damage, which could result from attempts at forcing the follower over wall 494 while the cams are not driven, is prevented by interlock lug 198. The latter member prohibits shifting of handle 162 and accordingly, the follower while cams 474 and 476 are not being driven, that is when switch 156 is "off" conditioned.

Corotational with shaft 214 is shutter mechanism 496 (FIGS. 12 and 27) which is operative to intermittently block light from lamp 172 along the optical axis. In the illustrated device, the shutter is double bladed and the parts are proportioned so that when the drive shaft 214 is rotating, the flicker frequency is 36 times a second. By appropriate proportioning, the shutter rate is synchronized with the rate of rotation of gear 470 so that, in this embodiment, gear 470 rotates once each time shaft 214 rotates 3 times.

A heat shield 500 (FIGS. 27 and 28) is rockably mounted for movement between (1) a protective condition (FIG. 27) across the optical axis between lamp 172 and the aperture 254 in aperture plate 269, and (2) an inactive condition when it does not intersect the optical axis. Control of the heat shield is through the medium of means generally designated 498 (FIG. 18), operably connected to handle 162.

A pin 502, which is carried from a bracket 504 supported by the chassis or framework of the projector, defines a rocking axis for said heat filter. An elongated control member or cord 506, comprising means 498, is connected at one end portion to the heat shield for rocking the same between its protective and inactive conditions. From its other end portion, the control cord is connected to extension 514 of a member herein shown as a toggle link or lever 508. The latter is rockably mounted about a pivot 510 supported from the chassis or framework of the projector and having a lower toggle surface 518 which is urged by spring 516 into sliding engagement with a member or pin follower 512, secured from handle 162 for locking said handle in each of its shifted conditions.

The parts are proportioned in a manner such that when handle 162 is disposed for causing engagement of follower 424 with either of cams 474 or 476 (dotted line condition of FIG. 27), the heat shield will be in its inactive condition. When handle 162 is disposed for "still" projection (solid line condition of FIG. 27), the heat shield will be disposed in its protective condition. Bracket 504 presents an abutment 520 to limit the movement of heat shield 500 at its protective position when handle 162 is correspondingly shifted.

The illustrated projector selectively accommodates either a standard 8mm. filmstrip 80A (FIG. 19) or a super 8mm. filmstrip 80B (FIG. 20) at any given time. As illustrated, the sprocket perforations 522 in standard 8mm. filmstrip 80A and the sprocket perforations 524 in super 8mm. filmstrip 80B are disposed differently, in their respective filmstrips. To accommodate the normal variations in the locations of the perforations, shuttle 362 is shiftable horizontally, that is, transversely of film path 236, to the end that best disposition of the claw 346 for advancing film is assured.

For such shifting, format change-handle 164 is rockably mounted about axis 526 (FIGS. 12 and 18). A cam 528 with an annular surface eccentrically disposed about axis 526, is rigidly secured to a depending portion of handle 164 for motivating association between a pair of associated arms or cam followers 530 of the shuttle mount 438. The parts are proportioned in a manner such that when the handle 164 is in the position illustrated in FIG. 18, shuttle 362 wild be conditioned for advancing filmstrip 80B. Upon movement of handle 164 to the right from its position of FIG. 18, mount 438 will be driven by cam 528 to the left to correspondingly move claw 364 to the left for proper disposition for advancing filmstrip 80A. The two operative positions of claw 364 are determined by the opposed ends of a slot 534 in the body of the handle 164 below cam 528. A stud or pin 536 which projects forwardly from wall 220 is engaged in said slot for limiting movement of handle 164 in each of its operative positions.

Figure 29:
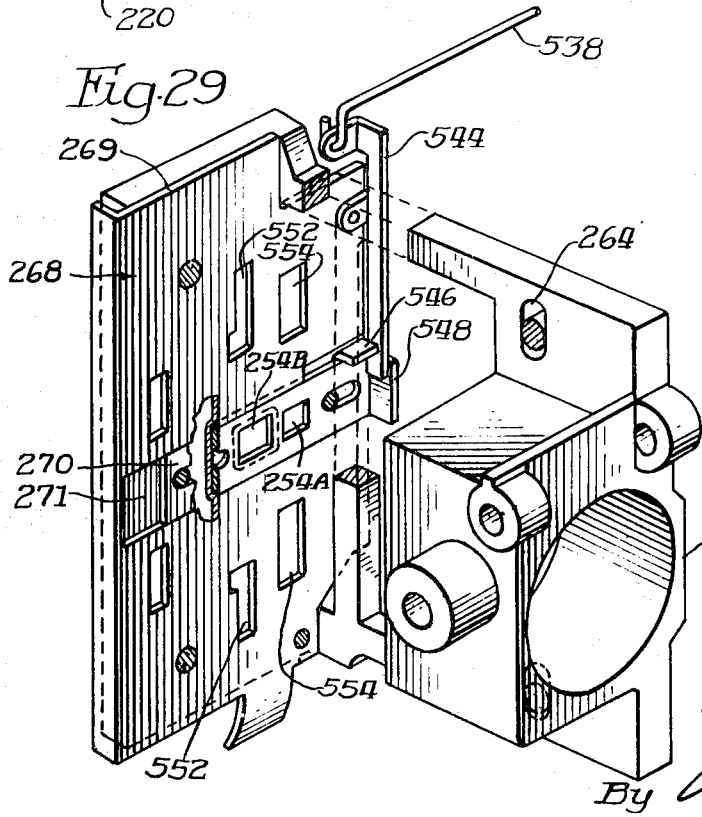
FIG. 29 is an enlarged perspective view of an aperture plate comprising said gate and embodying an aspect of the invention.
Figure 28:
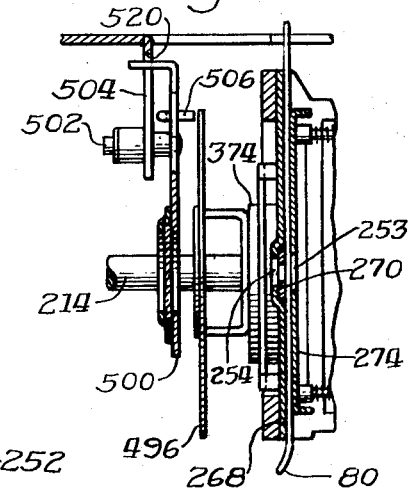
FIG. 28 is a detailed view taken on line 28—28 of FIG. 27 and illustrating a gate of said projector.

At one end thereof, a control rod or cord 538 is connected to the lower end portion of handle 164 for motivating format mask 270 in the front surface of aperture plate 269 (FIG. 29). Said mask with its apertures 254A and 254B which are aligned transversely of the optical axis, comprise aperture defining means. Aperture 254A is proportioned for projecting frames of standard 8mm. filmstrips. Aperture 254B is proportioned for projection of the frames of super 8mm. filmstrips. Mask 270 is adjustable between a first position in which aperture 254A is disposed about the optical axis in registration with aperture 254, and a second position in which aperture 254B is disposed about the optical axis in registration with aperture 254. The parts are arranged so that the first position of said mask 270 is assumed when claw 364 is in the position illustrated in FIG. 19, and the second position of mask 270 is assumed upon conditioning of claw 364 in the position of FIG. 20.

For operating mask 270, an end portion of cord 538, distal handle 164 is connected to an upper end portion of a lever 544 which is pivoted to the body of aperture plate 269. A lower end portion of lever 544 is engaged between a pair of opposed lugs or bosses 546 and 548 which extend from or are secured to said mask for shifting said slide in response to the shifting of handle 164.

Aperture plate 269 has a pair of vertically disposed slots 552 for entrance and removal of claw 246 into and from gate 238 at the opposite ends of the filmstrip advancing phase of each shuttle cycle.

Slots 552 are sufficiently long to accommodate a film advancing stroke of the shuttle while the claw is engaged in the perforations in the filmstrip. The parts are reciprocated so that at the beginning of each advancing stroke, the claw will be moved into the gate through slots 552 for engagement in an adjacent pair of filmstrip perforations, and at the end of each stroke, the claw will be withdrawn from the gate through slots 552 for return to a starting level in consequence of the rotation of up-and-down cam 374. Additionally, aperture plate 269 has a pair of vertically spaced-apart slots 554 which are disposed for projection therethrough of sensing arms 550 adjacent web path 236.

Slots 552 are adapted to accommodate entry of claw 364 either at the upper end portions or at the lower end portions thereof. When the claw enters the gate through lower end portions of the slots 552, shuttle 362 will be moved upwardly for advancing the film in a reverse direction during the upwardly moving portion of the up-and-down cam cycle. On the other hand, when the claw enters the gate through the upper portions of slots 552, the claw will remain in the gate for the downwardly moving portion of the cycle of the up-and-down cam for advancing the film in a forward direction.

The portions of slots 552 which will be entered by the claw and the phase of up-and-down cycle at which said entry will be made is governed by forward-reverse handle 168. The latter has a body 556 (FIGS. 1, 4, 22, 23 and 24) which is rockable adjacent a depending apron 558 of hanger plate 148 about pivot 560. The body has a boss fashioned as a rib 562 which is held by flange 564 of pivot 560 in frictional engagement with apron 558.

Handle 168 is rockable between a second or reverse condition in which rib 562 is disposed on one side of a ball detent 566 (FIG. 23 and solid line in FIG. 22) and a first or forward condition (dotted line in FIG. 22) in which said rib is disposed on the opposite side of detent 566. The detent is seated in an aperture in apron 558 where it is adjustably held from one side of said apron by a free end portion of spring 568. Spring 568 urges said ball toward engagement with body 556 which is disposed on the other side of said apron. The opposite end of spring 568 is fixed relative to apron 558 by the flattened end 569 of pivot 560. The foregoing arrangement ensures that handle 168 will not be shifted accidentally from one of its conditions to the other without the exertion of force sufficient to overcome the tension on the last detent.

A lug or extension 570 projects from body 556 through a window or slot 572 in apron 558 for closing microswitch 574 (FIGS. 21, 22 and 23) against terminal 578 when handle 168 is in its first condition. Switch 574 is normally closed against terminal 576 to interrupt or open a circuit in conductor 320 when handle 168 is in its second or reverse condition; in such a condition, solenoid 318 cannot then be energized. However, when handle 168 is in its first or forward condition, the circuit through conductor 320 is closed and said solenoid can be energized. The foregoing feature prevents accidental energization of said solenoid and therewith associated activity as a result of operation of various of the other handles during reverse projection of the filmstrip.

An integral offset extension 580 is carried from body 566 at the rear end of shaft 214 and is shiftable between a first or forward condition (corresponding to the forward condition of handle 168) and a second or reverse condition (corresponding to the reverse condition of handle 168). In its first condition, offset extension 580 is passive with respect to shaft 214, which is normally urged to the dotted line condition of FIG. 4. In its second condition, said extension bears against the rear end of said shaft to hold it in the solid line position of FIG. 4.

As said shaft is shifted axially between its first and second conditions, worm 284 will be caused to rotate gears 470 and 472 and therewith carried cams 474 and 476 while cam 374 remains unmoved. The parts are proportioned and arranged so that while shaft 214 is in its first condition, claw 364 will be moved into gate 236 for film advancement at the commencement of each downstroke of up-and-down cam 374, and withdrawn from said gate at the end of each downstroke. On the other hand, when shaft 214 is held in its second or reverse condition, claw 364 will be introduced through the gate 236 for film advancement at the commencement of each upstroke of cam 374 and withdrawn from the gate at the end of each upstroke. In consequence of the foregoing, filmstrip 80 may be intermittently shuttle motivated for projection in a forward or reverse direction.

While shuttle 362 is conditioned for reverse projection, torque for reversely taking up filmstrip 80 is applied to the supply reel. This is effected through the medium of arm 582 (FIG. 4), which at its lower end is rockable about pivot 326 and at its upper end is rockable about the axis defined by axle 584. Arm 582 is aligned with the forward end of shaft 214 and is arranged and proportioned in a manner such that as shaft 214 is moved from its forward condition to its reverse condition, said arm will be partially rotated by said shaft to accordingly rock gear mount 586 counterclockwise about the axis of axle 284 to the position of FIG. 4 for conditioning transmission 286 for reverse projection in accordance with the teachings of said copending application Ser. No. 706,243 now abandoned.

Mount 586 has an extension 588 which is trapped above lug 590 secured medially of rod 332. As mount 586 moves to the position of FIG. 4, rod 332 will be drawn downwardly to rock arm 334 counterclockwise and elevate driven wheel 290 to an active condition in driving engagement with a flange of reel 60.

Retention of the parts according to FIG. 4 is against the urging of spring 592, which will assist in restoring the parts for forward projection when handle 168 is manually moved to the dotted line position of FIG. 22.

What we claim is:

1. In a motion picture projector adapted for handling films with sprocket perforation of varied dispositions transversely of their image frames and having film supply means, film takeup means, and means including a claw for intermittently moving a filmstrip between said supply means and said takeup means, the combination of:
    means for shifting said claw transversely of a filmstrip according to the disposition of its perforations;
    means selectively positionable for changing the speed of intermittent filmstrip movement during projection; and
    interlock means arranged for movement between a first condition in which the speed changing means is enabled and said claw shifting means is disabled and a second condition in which said speed change means is disabled in any selected position and said claw shifting means is enabled.

2. In a motion picture projector having a body, film supply means, film takeup means, means defining a path through said projector and arranged for movement of a filmstrip between said supply means and said takeup means, an objective assembly arranged along said path for projection of images carried by said web, a claw for intermittently moving a filmstrip in said path and arranged for movement (1) in successive cycles each having a filmstrip advancing phase and a claw return phase, and (2) into and out of said path for engaging in film perforations during successive advancing phases and disengaging from film perforations during claw return phases, a combination comprising:
    cam means for limiting advancement of a filmstrip to any selected of various rates and having an active condition effective for moving said claw in successive cycles and into and out of said path and a passive condition in which said claw is stationary;
    means selectively positionable for changing the selected rate of filmstrip advancement;
    switch means for actuating said cam means into said active condition and said passive condition; and
    interlock means moved by said switch means for preventing operation of said changing means from any of said selective positions while said cam means is in a passive condition.

3. A combination according to claim 2 in which said cam means has spaced spaced-apart grooves arranged in sets corresponding to the rates of filmstrip advancement; a follower comprising said changing means mounted for shifting into selected engagement with each of said sets for controlling the in-and-out rate of said claw; and driving means for relatively moving said cam means and said follower.

4. A combination according to claim 3 in which said cam means comprises a first cam and a second cam mounted for rotation, each of said cams having a set of said grooves, said follower being arranged for successively engaging in and moving out of selected of said groove sets as said cams rotate.

5. A combination according to claim 4 characterized by a handle arranged from said body for manually shifting said follower, said switch means includes a manually operated switch supported from said body and having an "off" condition in which driving means is disabled for moving said cams and an "on" condition in which said driving means is enabled for cam movement, and said interlock means moved by said switch for preventing shifting of said follower from any of said cam means sets of grooves when said driving means is disabled.

6. In a motion picture projector having a housing, an apertured gate defining a film path through said housing, an objective assembly defining an optical axis transversely of said path and including a light source aligned with an aperture in said gate for projecting images carried on a filmstrip in said path, transport means having an active condition for intermittently advancing a filmstrip in said path across said optical axis and a passive condition in which filmstrip movement is prevented, and shifting means for selecting the condition of said transport means, the combination of:
    a heat filter arranged for movement between a first position across said optical axis for blocking heat on a filmstrip from said light source, and a second position out of the optical axis;
    a rockable member connected to said cord and arranged for response to said shifting means to hold said filter respectively in said first and second positions when said transport means is passively and actively conditioned, said rockable member is a toggle lever proportional for locking said shifting means in each condition of said transport means;
    said transport means has first and second active conditions for intermittently advancing a web in said path at different rates;

said control cord having one end portion connected to said toggle arm and another end portion connected to said filter; and a follower carried by said shifting means in sliding engagement with said toggle arm, said toggle arm being pivotally mounted and fashioned for rocking to the same attitude in response to shifting of said transport means to any selected of said first and second active conditions.

7. In a multiple speed film transport mechanism for motion picture projectors and the like having a shuttle arranged for movement (1) in successive cycles for intermittently advancing a film, and (2) "in-and-out" for engaging and disengaging a film at the beginning and end of the film advancing phase of each cycle, an improvement comprising:

first and second cams mounted for rotation about independent axes for controlling "in-and-out" shuttle movement at different rates;

means for selectively coupling said cams to said shuttle; and means for shifting said coupling means between said first and second cams.

8. A combination according to claim 7 characterized by power drivable means for cycling said shuttle through successive film advancing and return phases, and means for transmitting torque from said power driven means to said cams.

9. A combination according to claim 8 in which said power drivable means comprises:

a shaft mounted for rotation;

a third cam secured about said shaft for imparting reciprocative cycling motion to said shuttle and synchronously associated with said first and second cams.

10. A combination according to claim 9 in which the torque transmitting means comprises a gear transmission operatively connected to said shaft for driving said cams.

11. A combination according to claim 9 further characterized by:

a first gear operably connected to said shaft;

a second gear operably connected to said first gear, said first and second cams being secured in coplanar association to said first and second gears.

12. A combination according to claim 7 in which said cams have a pair of coplanar flat faces defining throw surfaces, and each of said cams has at least one dwell interrupting its throw surface and defining a follower track, said coupling being a shiftable assembly arranged for rocking said shuttle and including a follower biased into engagement with a selected cam for riding into and out of its follower track from and onto an associated throw surface upon cam rotation.

13. A combination according to claim 7 further characterized by a "still" cam rigidly disposed adjacent said first and second cams, and wherein said coupling means includes a follower being operable to engage said "still" cam for preventing the shuttle from engaging the film and being operable to engage said first and second cams for controlling the "in-and-out" shuttle movement.

14. A combination according to claim 13 wherein said first and second cams have a throw surface effecting a film disengaging shuttle condition and said "still" cam has a surface disposed in substantially the same plane as said throw surface.

15. A combination according to claim 13 further characterized by means for releasably holding said shifting means in any selected shifted position.

16. A combination according to claim 14 wherein said first and second cams have a plurality of dwells for effecting a film engagement shuttle condition to transport film at selected rates, and said "still" cam defining a pair of abutments for preventing shifting of said follower while said shuttle is in the film engagement condition.

* * * * *